United States Patent
Ohtani

(10) Patent No.: US 9,611,827 B2
(45) Date of Patent: Apr. 4, 2017

(54) INTERNAL COMBUSTION ENGINE MOUNTED WITH COMBUSTION PRESSURE SENSOR INCORPORATED GLOW PLUG AND SENSOR NONINCORPORATED GLOW PLUG

(71) Applicant: NGK SPARK PLUG CO., LTD., Nagoya, Aichi (JP)

(72) Inventor: Takayuki Ohtani, Iwakura (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 169 days.

(21) Appl. No.: 14/465,234

(22) Filed: Aug. 21, 2014

(65) Prior Publication Data

US 2015/0059679 A1   Mar. 5, 2015

(30) Foreign Application Priority Data

Aug. 28, 2013   (JP) .................. 2013-177068

(51) Int. Cl.
*F02P 19/02*   (2006.01)
*G01M 15/08*   (2006.01)
(Continued)

(52) U.S. Cl.
CPC ............ *F02P 19/028* (2013.01); *G01L 23/08* (2013.01); *G01L 23/26* (2013.01); *G01M 15/08* (2013.01); *F23Q 2007/002* (2013.01)

(58) Field of Classification Search
CPC ........ F02P 19/028; G01L 23/08; G01L 23/26; G01M 15/08; F23Q 2007/002
(Continued)

(56) References Cited

U.S. PATENT DOCUMENTS 7,444,973 B2 *  11/2008  Boucard .................. F23Q 7/001
                                                                     123/145 A
7,658,174 B2 *  2/2010   Stoller ................... F02P 19/022
                                                                     123/145 A
(Continued)

FOREIGN PATENT DOCUMENTS

| JP | 2001-123930 A | 5/2001 |
| JP | 2009-287496 A | 12/2009 |
| JP | 2012-177483 A | 9/2012 |

OTHER PUBLICATIONS

Korean Industrial Property Office, Notification of Provisional Refusal issued in corresponding Korean Application No. 10-2014-0104505, mailed Apr. 1, 2016.

*Primary Examiner* — Joseph Dallo
(74) *Attorney, Agent, or Firm* — Stites & Harbison, PLLC; Jeffrey A. Haeberlin; James R. Hayne

(57) ABSTRACT

In an internal combustion engine which includes a combustion pressure sensor incorporated glow plug and sensor nonincorporated glow plugs, a first plug regression line Lp1 and the second plug regression line Lp2 are in such a relation that, at any temperature Tx within the temperature range Tr, a second voltage Vp2x is lower than a first voltage Vp1x; the resistance of a second electricity supply line is greater than the resistance of a first electricity supply line; and a first section regression line and a second section regression line are in such a relation that, at any temperature Tx within the temperature range Tr, an overall voltage deviation |Vc1x−Vc2x|, which is the absolute value of the difference between a third voltage Vc1x and a fourth voltage Vc2x, is smaller than a first-second plug voltage difference (Vp1x−Vp2x).

8 Claims, 17 Drawing Sheets

(51) Int. Cl.
  *G01L 23/08*   (2006.01)
  *G01L 23/26*   (2006.01)
  *F23Q 7/00*    (2006.01)

(58) Field of Classification Search
  USPC ........ 73/114.16, 114.18, 114.19; 123/145 A,
     123/143 R, 435, 169 E, 169 R, 179.6,
     123/549; 701/101, 102
  See application file for complete search history.

(56) References Cited

U.S. PATENT DOCUMENTS

| | | | | |
|---|---|---|---|---|
| 7,825,352 B2* | 11/2010 | Last | ................... | F23Q 7/001 |
| | | | | 123/145 A |
| 8,217,310 B2* | 7/2012 | Sakurai | ................ | F02P 19/025 |
| | | | | 123/179.6 |
| 2001/0050275 A1* | 12/2001 | Uhl | ................... | F02P 19/021 |
| | | | | 219/270 |
| 2002/0043524 A1* | 4/2002 | Taniguchi | ............... | F02P 17/12 |
| | | | | 219/270 |
| 2003/0010306 A1* | 1/2003 | Nishimoto | ......... | F02D 41/1446 |
| | | | | 123/145 A |
| 2003/0127450 A1* | 7/2003 | Uhl | ................... | F02P 19/025 |
| | | | | 219/494 |
| 2004/0182144 A1* | 9/2004 | Okazaki | ................ | F02P 19/028 |
| | | | | 73/114.18 |
| 2004/0182145 A1* | 9/2004 | Okazaki | ................ | F02P 19/028 |
| | | | | 73/114.18 |
| 2004/0255889 A1* | 12/2004 | Kumada | ................ | F02P 19/025 |
| | | | | 123/179.6 |
| 2006/0032472 A1* | 2/2006 | Yamada | ................. | G01L 23/22 |
| | | | | 123/145 A |
| 2006/0207541 A1* | 9/2006 | Hiramatsu | ............ | F02P 19/022 |
| | | | | 123/145 A |
| 2008/0140295 A1* | 6/2008 | De Pottey | ............. | F02M 31/07 |
| | | | | 701/101 |
| 2009/0242540 A1* | 10/2009 | Itoh | ................... | F23Q 7/001 |
| | | | | 219/267 |
| 2009/0294431 A1* | 12/2009 | Sakurai | ................ | F02P 19/025 |
| | | | | 219/268 |
| 2010/0079155 A1* | 4/2010 | Matsuoka | .............. | G01L 23/18 |
| | | | | 324/691 |
| 2010/0082219 A1* | 4/2010 | Ma | ................... | F02D 35/026 |
| | | | | 701/102 |
| 2011/0220073 A1* | 9/2011 | Sackmann | ............ | F02D 35/023 |
| | | | | 123/623 |
| 2011/0251774 A1* | 10/2011 | Cassani | ................ | F02P 19/023 |
| | | | | 701/102 |
| 2013/0269640 A1 | 10/2013 | Nakamura et al. | | |

\* cited by examiner

INTERNAL COMBUSTION ENGINE MOUNTED WITH COMBUSTION PRESSURE SENSOR INCORPORATED GLOW PLUG AND SENSOR NONINCORPORATED GLOW PLUG

BACKGROUND OF THE INVENTION

Field of the Invention

The present invention relates to an internal combustion engine in which a combustion pressure sensor incorporated glow plug is mounted to one or more of a plurality of cylinders of an engine body, and a sensor nonincorporated glow plug having no pressure sensor is mounted to each of the remaining cylinders.

Background Art

A known combustion pressure sensor incorporated glow plug is a glow plug which assists in start-up of an internal combustion engine such as a diesel engine and into which a pressure sensor is incorporated for detecting combustion pressure in a combustion chamber of the internal combustion engine (refer to, for example, Patent Document 1). In the combustion pressure sensor incorporated glow plug, a heater is disposed within a housing in an axially movable condition. An axial movement of the heater resulting from variation in combustion pressure is transmitted to a pressure sensor, thereby detecting combustion pressure within the combustion chamber of the internal combustion engine.

The internal combustion engine (engine body) has a plurality of cylinders, such as four or six cylinders. In view of costs, etc., such a combustion pressure sensor incorporated glow plug may be used in the internal combustion engine such that the combustion pressure sensor incorporated glow plug is mounted to one or more of a plurality of cylinders, whereas an ordinary glow plug (hereinafter, may be called a sensor nonincorporated glow plug) having no pressure sensor (combustion pressure sensor) is mounted to each of the remaining cylinders.

RELATED ART DOCUMENTS

Patent Document] is Japanese Patent Application Laid-Open (kokai) No. 2012-177483.

BRIEF SUMMARY OF THE INVENTION

However, according to certain control of heaters of glow plugs of cylinders by the ECU (electronic control unit) of a vehicle, the same control is conducted on the cylinders regardless of existence of the combustion pressure sensor such that the heaters are pulse-energized at the same duty ratio without individually controlling the cylinders according to whether or not the combustion pressure incorporated glow plug is provided. Meanwhile, because of a difference in structure, the combustion pressure sensor incorporated glow plug and the sensor nonincorporated glow plug differ in a heater energization characteristic. Specifically, even when the same voltage is applied to the glow plugs, the respective heaters generate heat of different temperatures. Thus, when the ECU applies electricity to the two types of glow plugs; i.e., the sensor incorporated and nonincorporated glow plugs, at the same duty ratio (effective applied voltage), the sensor incorporated and nonincorporated glow plugs may differ in heater temperature; as a result, the cylinders are apt to differ in a glow plug action of assisting in start-up.

The present invention has been conceived in view of the above problem, and an object of the present invention is to provide an internal combustion engine in which a combustion pressure sensor incorporated glow plug is mounted to one or more of a plurality of cylinders of an engine body, whereas a sensor nonincorporated glow plug having no pressure sensor is mounted to each of the remaining cylinders and in which, when the same effective voltage is applied to overall structures each comprising of a cable and a glow plug, the occurrence of a difference in heater temperature among the cylinders is restrained.

A mode of the present invention provides an internal combustion engine comprising an engine body having a plurality of cylinders; a combustion pressure sensor incorporated glow plug mounted to one or more (i.e., at least one) of the plurality of cylinders and including a first heater which generates heat through energization, and a pressure sensor for detecting combustion pressure of the respective cylinder (i.e., the cylinder(s) to which the combustion pressure sensor incorporated glow plug is mounted); a first electricity supply cable including a first electricity supply line for supplying electricity from an external power supply to the first heater of the combustion pressure sensor incorporated glow plug; a sensor nonincorporated glow plug mounted to each of the remaining cylinders to which the combustion pressure sensor incorporated glow plug is not mounted, and including a second heater without a pressure sensor, which generates heat through energization; and a second electricity supply cable including a second electricity supply line for supplying electricity from the external power supply to the second heater of the sensor nonincorporated glow plug. Resistance of the second electricity supply line is greater than resistance of the first electricity supply line. Now, defining a first plug regression line as a first plug voltage vs. temperature characteristic indicative of a relation, within a temperature range of 950° C. to 1,350° C., between a first plug voltage applied to the combustion pressure sensor incorporated glow plug and a first heater temperature indicative of a temperature of heat generated by the first heater, defining a second plug regression line as a second plug voltage vs. temperature characteristic indicative of a relation, within the temperature range, between a second plug voltage applied to the sensor nonincorporated glow plug and a second heater temperature indicative of a temperature of heat generated by the second heater, defining a first voltage as the first plug voltage at which the first heater temperature becomes a predetermined temperature within the temperature range on the first plug regression line, defining a second voltage as the second plug voltage at which the second heater temperature becomes the same predetermined temperature on the second plug regression line, and defining a first-second plug voltage difference as a difference at the predetermined temperature between the first voltage and the second voltage, the first plug regression line and the second plug regression line are in such a relation that, at any predetermined temperature within the temperature range, the second voltage is lower than the first voltage. Further defining a first section regression line as a first section voltage vs. temperature characteristic indicative of a relation, within the temperature range, between a first section voltage applied to a first section comprising the combustion pressure sensor incorporated glow plug and the first electricity supply cable, and the first heater temperature, defining a second section regression line as a second section voltage vs. temperature characteristic indicative of a relation, within the temperature range, between a second section voltage applied to a second section comprising the sensor nonincorporated glow plug and the second electricity supply cable, and the second heater temperature, defining a third voltage as the first section voltage at which the first heater temperature becomes the predetermined temperature on the first section regression line, defining a fourth voltage as the second section voltage at which the second heater temperature becomes the same predetermined temperature on the second section regression line, and defining an overall voltage deviation as an absolute value of a difference at the predetermined temperature between the third voltage and the fourth voltage, the first section regression line and the second section regression line are in such a relation that, at any predetermined temperature within the temperature range, the overall voltage deviation is smaller than the first-second plug voltage difference.

In this internal combustion engine, regarding the combustion pressure sensor incorporated glow plug and the sensor nonincorporated glow plug, the first plug regression line and the second plug regression line are in such a relation that, at any heater temperature within a temperature range of 950° C. to 1,350° C., the second voltage is lower than the first voltage.

That is, the combustion pressure sensor incorporated glow plug and the sensor nonincorporated glow plug do not match in a heater energization characteristic indicative of the relation between voltages (first plug voltage and second plug voltage) applied to the glow plugs and temperatures of heat generated by the heaters (first heater temperature and second heater temperature). Also, in the case where the first heater temperature and the second heater temperature are to have the same temperature, a required second plug voltage is lower than a required first plug voltage. In other words, in the case where the first plug voltage and the second plug voltage applied to the respective glow plugs have the same voltage, the second heater temperature becomes higher than the first heater temperature.

Thus, in this internal combustion engine, resistance of the second electricity supply line of the second electricity supply cable is rendered greater than resistance of the first electricity supply line of the first electricity supply cable. Accordingly, at any heater temperature within the aforementioned temperature range, the first section regression line and the second section regression line are in such a relation that the overall voltage deviation is smaller than the first-second plug voltage difference. That is, deviation between the first section voltage and the second section voltage (absolute value of the difference between the two voltages) required for the first heater temperature and the second heater temperature to have the same temperature is smaller than the difference between the first plug voltage and the second plug voltage.

As mentioned above, in this internal combustion engine, resistance of the second electricity supply line is rendered greater than resistance of the first electricity supply line. By virtue of this, as compared with the relation between energization characteristics of the heaters with respect to the glow plugs, an energization characteristic (the relation between the first section voltage and the first heater temperature) of the first section (the combustion pressure sensor incorporated glow plug and the first electricity supply cable) and an energization characteristic (the relation between the second section voltage and the second heater temperature) of the second section (the sensor nonincorporated glow plug and the second electricity supply cable) are closer to each other. Thus, there can be yielded an internal combustion engine in which, upon application of the same effective voltage to overall structures each comprising a cable and a glow plug, the difference in heater temperature among cylinders is restrained.

A method of rendering resistance of the second electricity supply line greater than resistance of the first electricity supply line is to form the second electricity supply line from a material having specific resistance (electric resistivity, $\Omega \cdot m$) higher than that of a material used to form the first electricity supply line. Other methods are to render the cross-sectional area of the second electricity supply line smaller than that of the first electricity supply line and to render the overall length of the second electricity supply line longer than that of the first electricity supply line. Particularly, since changing length is easy for the first electricity supply line (first electricity supply cable) and the second electricity supply line (second electricity supply cable), by means of rendering the overall length of the second electricity supply line longer than that of the first electricity supply line, resistance of the second electricity supply line can be easily rendered greater than resistance of the first electricity supply line.

Another mode of the present invention provides an internal combustion engine comprising an engine body having a plurality of cylinders; a combustion pressure sensor incorporated glow plug mounted to one or more (i.e., at least one) of the plurality of cylinders and including a first heater which generates heat through energization, and a pressure sensor for detecting combustion pressure of the respective cylinder (i.e., the cylinder(s) to which the combustion pressure sensor incorporated glow plug is mounted); a first electricity supply cable including a first electricity supply line for supplying electricity from an external power supply to the first heater of the combustion pressure sensor incorporated glow plug; a sensor nonincorporated glow plug mounted to each of the remaining cylinders to which the combustion pressure sensor incorporated glow plug is not mounted, and including a second heater without a pressure sensor, which generates heat through energization; and a second electricity supply cable including a second electricity supply line for supplying electricity from the external power supply to the second heater of the sensor nonincorporated glow plug. The combustion pressure sensor incorporated glow plug has a first electrically conductive member connected to the first electricity supply line to electrically connect the first electricity supply line to the first heater. The sensor nonincorporated glow plug has a second electrically conductive member connected to the second electricity supply line to electrically connect the second electricity supply line to the second heater. A sum of resistance of the second electrically conductive member and resistance of the second electricity supply line is greater than a sum of resistance of the first electrically conductive member and resistance of the first electricity supply line. Now, defining a first residual section regression line as a first residual section voltage vs. temperature characteristic indicative of a relation, within a temperature range of 950° C. to 1,350° C., between a first residual section voltage applied to a first residual section encompassing the first heater and remaining after eliminating the first electrically conductive member from the combustion pressure sensor incorporated glow plug (i.e., without the first electrically conductive member), and a first heater temperature indicative of a temperature of heat generated by the first heater, defining a second residual section regression line as a second residual section voltage vs. temperature characteristic indicative of a relation, within the temperature range, between a second residual section voltage applied to a second residual section encompassing the second heater and remaining after eliminating the second electrically conductive member from the sensor nonincorporated glow plug (i.e., without the second electrically conductive member), and a second heater temperature indicative of a temperature of heat generated by the second heater, defining a first voltage as the first residual section voltage at which the first heater temperature becomes a predetermined temperature within the temperature range on the first residual section regression line, defining a second voltage as the second residual section voltage at which the second heater temperature becomes the same predetermined temperature on the second residual section regression line, and defining a first-second residual section voltage difference as a difference at the predetermined temperature between the first voltage and the second voltage, the first residual section regression line and the second residual section regression line are in such a relation that, at any predetermined temperature within the temperature range, the second voltage is lower than the first voltage. Further defining a first section regression line as a first section voltage vs. temperature characteristic indicative of a relation, within the temperature range, between a first section voltage applied to a first section comprising the combustion pressure sensor incorporated glow plug and the first electricity supply cable, and the first heater temperature, defining a second section regression line as a second section voltage vs. temperature characteristic indicative of a relation, within the temperature range, between a second section voltage applied to a second section comprising the sensor nonincorporated glow plug and the second electricity supply cable, and the second heater temperature, defining a third voltage as the first section voltage at which the first heater temperature becomes the predetermined temperature on the first section regression line, defining a fourth voltage as the second section voltage at which the second heater temperature becomes the same predetermined temperature on the second section regression line, and defining an overall voltage deviation as an absolute value of a difference at the predetermined temperature between the third voltage and the fourth voltage, the first section regression line and the second section regression line are in such a relation that, at any predetermined temperature within the temperature range, the overall voltage deviation is smaller than the first-second residual section voltage difference.

In this internal combustion engine, regarding the combustion pressure sensor incorporated glow plug and the sensor nonincorporated glow plug, the first residual section regression line and the second residual section regression line are in such a relation that, at any heater temperature within a temperature range of 950° C. to 1,350° C., the second voltage is lower than the first voltage.

That is, the combustion pressure sensor incorporated glow plug and the sensor nonincorporated glow plug do not match in a heater energization characteristic; specifically, in comparison of the first residual section encompassing the first heater and the second residual section encompassing the second heater, an energization characteristic of the first heater (the relation between the first residual section voltage and the first heater temperature) with respect to the first residual section and an energization characteristic of the second heater (the relation between the second residual section voltage and the second heater temperature) with respect to the second residual section do not match. Also, in the case where the first heater temperature and the second heater temperature are to have the same temperature, a required second residual section voltage is lower than a required first residual section voltage. In other words, in the case where the first residual section voltage and the second residual section voltage have the same voltage, the second heater temperature becomes higher than the first heater temperature.

Thus, in this internal combustion engine, the sum of resistance of the second electrically conductive member and resistance of the second electricity supply line is rendered greater than the sum of resistance of the first electrically conductive member and resistance of the first electricity supply line. Accordingly, at any heater temperature within the aforementioned temperature range, the first section regression line and the second section regression line are in such a relation that the overall voltage deviation is smaller than the first-second residual section voltage difference. That is, deviation between the first section voltage and the second section voltage (absolute value of the difference between the two voltages) required for the first heater temperature and the second heater temperature to have the same temperature is smaller than the difference between the first residual section voltage and the second residual section voltage.

As mentioned above, in this internal combustion engine, the sum of resistance of the second electrically conductive member and resistance of the second electricity supply line is rendered greater than the sum of resistance of the first electrically conductive member and resistance of the first electricity supply line. By virtue of this, as compared with the relation between energization characteristics of the heaters with respect to the first residual section and the second residual section, an energization characteristic (the relation between the first section voltage and the first heater temperature) of the first section (the combustion pressure sensor incorporated glow plug and the first electricity supply cable) and an energization characteristic (the relation between the second section voltage and the second heater temperature) of the second section (the sensor nonincorporated glow plug and the second electricity supply cable) are closer to each other. Thus, there can be yielded an internal combustion engine in which, upon application of the same effective voltage to overall structures each comprising a cable and a glow plug, the difference in heater temperature among cylinders is restrained.

Additionally, in this internal combustion engine, by means of not only rendering resistance of the second electricity supply line greater than resistance of the first electricity supply line, but also rendering resistance of the second electrically conductive member greater than resistance of the first electrically conductive member, energization characteristics of the heaters with respect to overall structures each comprising a cable and a glow plug can be brought close to each other.

A method of rendering the sum of resistance of the second electrically conductive member and resistance of the second electricity supply line greater than the sum of resistance of the first electrically conductive member and resistance of the first electricity supply line is not only to form the second electricity supply line from a material having specific resistance (electric resistivity) higher than that of a material used to form the first electricity supply line, but also to form the second electrically conductive member from a material having specific resistance (electric resistivity) higher than that of a material used to form the first electrically conductive member.

A further method is to reduce the cross-sectional areas or to increase the overall lengths of the second electricity supply line and the second electrically conductive member for rendering the second electricity supply line and the second electrically conductive member greater in resistance than the first electricity supply line and the first electrically conductive member.

Since changing length is easy for the first electricity supply line (first electricity supply cable) and the second electricity supply line (second electricity supply cable), by means of rendering the overall length of the second electricity supply line longer than that of the first electricity supply line, resistance of the second electricity supply line can be easily rendered greater than resistance of the first electricity supply line.

Preferably, in the above-mentioned internal combustion engine, the combustion pressure sensor incorporated glow plug further includes a tubular first housing which accommodates the first heater in such a manner that a forward end portion of the first heater protrudes from a forward end of the first housing; the first electrically conductive member includes a first external terminal disposed at a rear side and connected to the first electricity supply line and a rodlike first shaft inserted in the first housing and electrically connecting the first heater and the first external terminal; the sensor nonincorporated glow plug further includes a tubular second housing which accommodates the second heater in such a manner that a forward end portion of the second heater protrudes from a forward end of the second housing; the second electrically conductive member includes a second external terminal disposed at a rear side and connected to the second electricity supply line and a rodlike second shaft inserted in the second housing and electrically connecting the second heater and the second external terminal; and at least one of the following conditions is employed: resistance of the second shaft is greater than resistance of the first shaft, and resistance of the second electricity supply line is greater than resistance of the first electricity supply line.

In this internal combustion engine, in order to render the sum of resistance of the second electrically conductive member and resistance of the second electricity supply line greater than the sum of resistance of the first electrically conductive member and resistance of the first electricity supply line, at least one of the following conditions is employed: resistance of a second shaft is greater than resistance of a first shaft, and resistance of the second electricity supply line is greater than resistance of the first electricity supply line. That is, one of the following three conditions is employed: resistance of the second electricity supply line is greater than resistance of the first electricity supply line; resistance of the second shaft is greater than resistance of the first shaft; and resistance of the second electricity supply line is greater than resistance of the first electricity supply line, and resistance of the second shaft is greater than resistance of the first shaft.

Since the first shaft and the second shaft are major portions of the first electrically conductive member and the second electrically conductive member, respectively, and have a certain length and a certain diameter, differentiating resistances of the first and second shafts is relatively easy. Thus, by means of rendering resistance of the second electricity supply line greater than resistance of the first electricity supply line, or, in place of or in addition to this, rendering resistance of the second shaft greater than resistance of the first shaft, heater energization characteristics of overall structures each comprising a cable and a glow plug can be brought close to each other.

A further mode of the present invention provides an internal combustion engine comprising an engine body having a plurality of cylinders; a combustion pressure sensor incorporated glow plug mounted to one or more (i.e., at least one) of the plurality of cylinders and having a first heater which generates heat through energization, and a pressure sensor for detecting combustion pressure of the respective cylinder (i.e., the cylinder(s) to which the combustion pressure sensor incorporated glow plug is mounted); a first electricity supply cable including a first electricity supply line for supplying electricity from an external power supply to the first heater of the combustion pressure sensor incorporated glow plug; a sensor nonincorporated glow plug mounted to each of the remaining cylinders to which the combustion pressure sensor incorporated glow plug is not mounted, and including a second heater without a pressure sensor, which generates heat through energization; and a second electricity supply cable including a second electricity supply line for supplying electricity from the external power supply to the second heater of the sensor nonincorporated glow plug. Resistance of the second electricity supply line is smaller than resistance of the first electricity supply line. Now, defining a first plug regression line as a first plug voltage vs. temperature characteristic indicative of a relation, within a temperature range of 950° C. to 1,350° C., between a first plug voltage applied to the combustion pressure sensor incorporated glow plug and a first heater temperature indicative of a temperature of heat generated by the first heater, defining a second plug regression line as a second plug voltage vs. temperature characteristic indicative of a relation, within the temperature range, between a second plug voltage applied to the sensor nonincorporated glow plug and a second heater temperature indicative of a temperature of heat generated by the second heater, defining a first voltage as the first plug voltage at which the first heater temperature becomes a predetermined temperature within the temperature range on the first plug regression line, defining a second voltage as the second plug voltage at which the second heater temperature becomes the same predetermined temperature on the second plug regression line, and defining a second-first plug voltage difference as a difference at the predetermined temperature between the second voltage and the first voltage, the first plug regression line and the second plug regression line are in such a relation that, at any predetermined temperature within the temperature range, the second voltage is higher than the first voltage. Further defining a first section regression line as a first section voltage vs. temperature characteristic indicative of a relation, within the temperature range, between a first section voltage applied to a first section comprising the combustion pressure sensor incorporated glow plug and the first electricity supply cable, and the first heater temperature, defining a second section regression line as a second section voltage vs. temperature characteristic indicative of a relation, within the temperature range, between a second section voltage applied to a second section comprising the sensor nonincorporated glow plug and the second electricity supply cable, and the second heater temperature, defining a third voltage is the first section voltage at which the first heater temperature becomes the predetermined temperature on the first section regression line, defining a fourth voltage is the second section voltage at which the second heater temperature becomes the same predetermined temperature on the second section regression line, and defining an overall voltage deviation is an absolute value of a difference at the predetermined temperature between the fourth voltage and the third voltage, the first section regression line and the second section regression line are in such a relation that, at any predetermined temperature within the temperature range, the overall voltage deviation is smaller than the second-first plug voltage difference.

In this internal combustion engine, regarding the combustion pressure sensor incorporated glow plug and the sensor nonincorporated glow plug, the first plug regression line and the second plug regression line are in such a relation that, at any heater temperature within a temperature range of 950° C. to 1,350° C., the second voltage is higher than the first voltage.

That is, the relation between the first plug voltage vs. first heater temperature characteristic and the second plug voltage vs. second heater temperature characteristic is opposite that of the aforementioned internal combustion engine; specifically, in the case where the first heater temperature and the second heater temperature are to have the same temperature, a required second plug voltage is higher than a required first plug voltage. In other words, in the case where the first plug voltage and the second plug voltage applied to the respective glow plugs have the same voltage, the second heater temperature becomes lower than the first heater temperature.

Thus, in this internal combustion engine, resistance of the second electricity supply line of the second electricity supply cable is rendered smaller than resistance of the first electricity supply line of the first electricity supply cable. Accordingly, at any heater temperature within the aforementioned temperature range, the first section regression line and the second section regression line are in such a relation that the overall voltage deviation is smaller than the second-first plug voltage difference. That is, deviation between the second section voltage and the first section voltage (absolute value of the difference between the two voltages) required for the first heater temperature and the second heater temperature to have the same temperature is smaller than the difference between the second plug voltage and the first plug voltage.

As mentioned above, in this internal combustion engine, resistance of the second electricity supply line is rendered smaller than resistance of the first electricity supply line. By virtue of this, as compared with the relation between energization characteristics of the heaters with respect to the glow plugs, an energization characteristic (the relation between the first section voltage and the first heater temperature) of the first section (the combustion pressure sensor incorporated glow plug and the first electricity supply cable) and an energization characteristic (the relation between the second section voltage and the second heater temperature) of the second section (the sensor nonincorporated glow plug and the second electricity supply cable) are closer to each other. Thus, there can be yielded an internal combustion engine in which, upon application of the same effective voltage to overall structures each comprising a cable and a glow plug, the difference in heater temperature among cylinders is restrained.

A still further mode of the present invention provides an internal combustion engine comprising an engine body having a plurality of cylinders; a combustion pressure sensor incorporated glow plug mounted to one or more (i.e., at least one) of the plurality of cylinders, including a first heater which generates heat through energization, and a pressure sensor for detecting combustion pressure of the respective cylinders (i.e., the cylinder(s) to which the combustion pressure sensor incorporated glow plug is mounted); a first electricity supply cable including a first electricity supply line for supplying electricity from an external power supply to the first heater of the combustion pressure sensor incorporated glow plug; a sensor nonincorporated glow plug mounted to each of the remaining cylinders to which the combustion pressure sensor incorporated glow plug is not mounted, including a second heater without a pressure sensor, which generates heat through energization; and a second electricity supply cable including a second electricity supply line for supplying electricity from the external power supply to the second heater of the sensor nonincorporated glow plug. The combustion pressure sensor incorporated glow plug has a first electrically conductive member connected to the first electricity supply line to electrically connect the first electricity supply line to the first heater. The sensor nonincorporated glow plug has a second electrically conductive member connected to the second electricity supply line to electrically connect the second electricity supply line to the second heater. A sum of resistance of the second electrically conductive member and resistance of the second electricity supply line is smaller than a sum of resistance of the first electrically conductive member and resistance of the first electricity supply line. Now, defining a first residual section regression line as a first residual section voltage vs. temperature characteristic indicative of a relation, within a temperature range of 950° C. to 1,350° C., between a first residual section voltage applied to a first residual section encompassing the first heater and remaining after eliminating the first electrically conductive member from the combustion pressure sensor incorporated glow plug (i.e., without the first electrically conductive member), and a first heater temperature indicative of a temperature of heat generated by the first heater, defining a second residual section regression line as a second residual section voltage vs. temperature characteristic indicative of a relation, within the temperature range, between a second residual section voltage applied to a second residual section encompassing the second heater and remaining after eliminating the second electrically conductive member from the sensor nonincorporated glow plug (i.e., without the second electrically conductive member), and a second heater temperature indicative of a temperature of heat generated by the second heater, defining a first voltage as the first residual section voltage at which the first heater temperature becomes a predetermined temperature within the temperature range on the first residual section regression line, defining a second voltage as the second residual section voltage at which the second heater temperature becomes the same predetermined temperature on the second residual section regression line, and defining a second-first residual section voltage difference as a difference at the predetermined temperature between the second voltage and the first voltage, the first residual section regression line and the second residual section regression line are in such a relation that, at any predetermined temperature within the temperature range, the second voltage is higher than the first voltage. Further defining a first section regression line as a first section voltage vs. temperature characteristic indicative of a relation, within the temperature range, between a first section voltage applied to a first section comprising the combustion pressure sensor incorporated glow plug and the first electricity supply cable, and the first heater temperature, defining a second section regression line as a second section voltage vs. temperature characteristic indicative of a relation, within the temperature range, between a second section voltage applied to a second section comprising the sensor nonincorporated glow plug and the second electricity supply cable, and the second heater temperature, defining a third voltage as the first section voltage at which the first heater temperature becomes the predetermined temperature on the first section regression line, defining a fourth voltage as the second section voltage at which the second heater temperature becomes the same predetermined temperature on the second section regression line, and defining an overall voltage deviation as an absolute value of a difference at the predetermined temperature between the fourth voltage and the third voltage, the first section regression line and the second section regression line are in such a relation that, at any predetermined temperature within the temperature range, the overall voltage deviation is smaller than the second-first residual section voltage difference.

In this internal combustion engine, regarding the combustion pressure sensor incorporated glow plug and the sensor nonincorporated glow plug, the first residual section regression line and the second residual section regression line are in such a relation that, at any heater temperature within a temperature range of 950° C. to 1,350° C., the second voltage is higher than the first voltage.

That is, the relation between the first residual section voltage vs. first heater temperature characteristic and the second residual section voltage vs. second heater temperature characteristic is opposite that of the aforementioned internal combustion engine; specifically, in the case where the first heater temperature and the second heater temperature are to have the same temperature, a required second residual section voltage is higher than a required first residual section voltage. In other words, in the case where the first residual section voltage and the second residual section voltage have the same voltage, the second heater temperature becomes lower than the first heater temperature.

Thus, in this internal combustion engine, the sum of resistance of the second electrically conductive member and resistance of the second electricity supply line is rendered smaller than the sum of resistance of the first electrically conductive member and resistance of the first electricity supply line. Accordingly, at any heater temperature within the aforementioned temperature range, the first section regression line and the second section regression line are in such a relation that the overall voltage deviation is smaller than the second-first residual section voltage difference. That is, deviation between the second section voltage and the first section voltage (absolute value of the difference between the two voltages) required for the first heater temperature and the second heater temperature to have the same temperature is smaller than the difference between the second residual section voltage and the first residual section voltage.

As mentioned above, in this internal combustion engine, the sum of resistance of the second electrically conductive member and resistance of the second electricity supply line is rendered smaller than the sum of resistance of the first electrically conductive member and resistance of the first electricity supply line. By virtue of this, as compared with the relation between energization characteristics of the heaters with respect to the first residual section and the second residual section, an energization characteristic (the relation between the first section voltage and the first heater temperature) of the first section (the combustion pressure sensor incorporated glow plug and the first electricity supply cable) and an energization characteristic (the relation between the second section voltage and the second heater temperature) of the second section (the sensor nonincorporated glow plug and the second electricity supply cable) are closer to each other. Thus, there can be yielded an internal combustion engine in which, upon application of the same effective voltage to overall structures each comprising a cable and a glow plug, the difference in heater temperature among cylinders is restrained.

Additionally, in this internal combustion engine, by means of not only rendering resistance of the second electricity supply line smaller than resistance of the first electricity supply line, but also rendering resistance of the second electrically conductive member smaller than resistance of the first electrically conductive member, energization characteristics of the heaters with respect to overall structures each comprising a cable and a glow plug can be brought close to each other.

Furthermore, preferably, in the above-mentioned internal combustion engine, the combustion pressure sensor incorporated glow plug further includes a tubular first housing which accommodates the first heater in such a manner that a forward end portion of the first heater protrudes from a forward end of the first housing; the first electrically conductive member includes a first external terminal disposed at a rear side and connected to the first electricity supply line and a rodlike first shaft inserted in the first housing and electrically connecting the first heater and the first external terminal; the sensor nonincorporated glow plug further includes a tubular second housing which accommodates the second heater in such a manner that a forward end portion of the second heater protrudes from a forward end of the second housing; the second electrically conductive member includes a second external terminal disposed at a rear side and connected to the second electricity supply line and a rodlike second shaft inserted in the second housing and electrically connecting the second heater and the second external terminal; and at least one of the following conditions is employed: resistance of the second shaft is smaller than resistance of the first shaft, and resistance of the second electricity supply line is smaller than resistance of the first electricity supply line.

In this internal combustion engine, in order to render the sum of resistance of the second electrically conductive member and resistance of the second electricity supply line smaller than the sum of resistance of the first electrically conductive member and resistance of the first electricity supply line, at least one of the following conditions is employed: resistance of a second shaft is smaller than resistance of a first shaft, and resistance of the second electricity supply line is smaller than resistance of the first electricity supply line. That is, one of the following three conditions is employed: resistance of the second electricity supply line is smaller than resistance of the first electricity supply line; resistance of the second shaft is smaller than resistance of the first shaft; and resistance of the second electricity supply line is smaller than resistance of the first electricity supply line, and resistance of the second shaft is smaller than resistance of the first shaft.

Since the first shaft and the second shaft are major portions of the first electrically conductive member and the second electrically conductive member, respectively, and have a certain length and a certain diameter, differentiating resistances of the first and second shafts is relatively easy. Thus, by means of rendering resistance of the second electricity supply line smaller than resistance of the first electricity supply line, or, in place of or in addition to this, rendering resistance of the second shaft smaller than resistance of the first shaft, heater energization characteristics of overall structures each comprising a cable and a glow plug can be brought close to each other.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE INVENTION

A. First Embodiment

Figure 1:
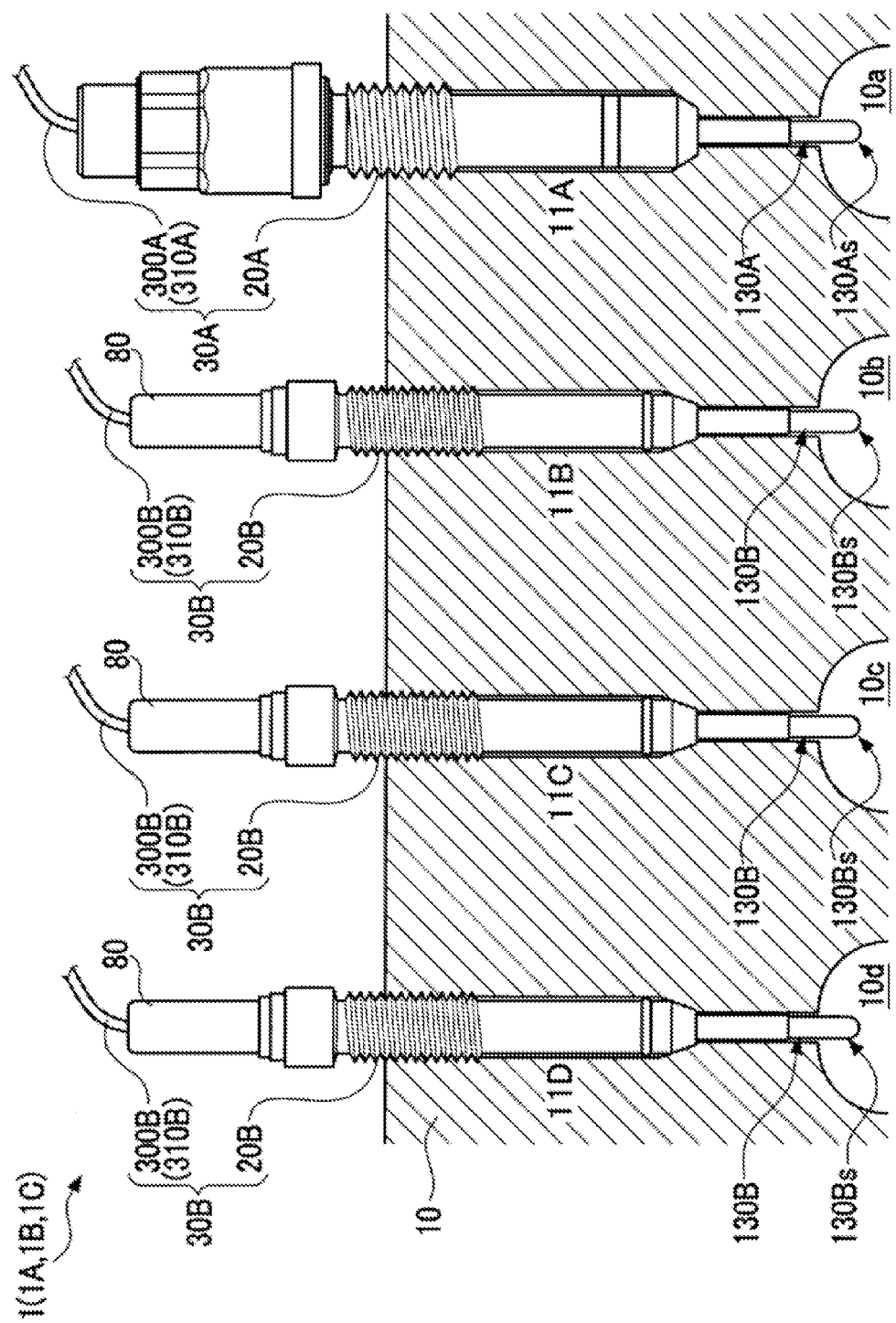
FIG. 1 is a schematic sectional view showing the glow plug mounting structure of internal combustion engines according to first to fourth embodiments of the present invention.

A first embodiment of the present invention will next be described with reference to the drawings. FIG. 1 shows the glow plug mounting structure of an internal combustion engine 1 according to the first embodiment. The internal combustion engine 1 is a 4-cylinder diesel engine equipped with an engine body 10 having four cylinders 11A, 11B, 11C, and 11D. Of the four cylinders 11A to 11D of the engine body 10, the cylinder 11A has a combustion pressure sensor incorporated glow plug 20A mounted thereto and having a pressure sensor 200 (see FIGS. 2 and 3) for detecting combustion pressure of the cylinder 11A. Also, of the four cylinders 11A to 11D of the engine body 10, the remaining three cylinders 11B to 11D each have a sensor nonincorporated glow plug 20B mounted thereto and having no pressure sensor.

Figure 2:
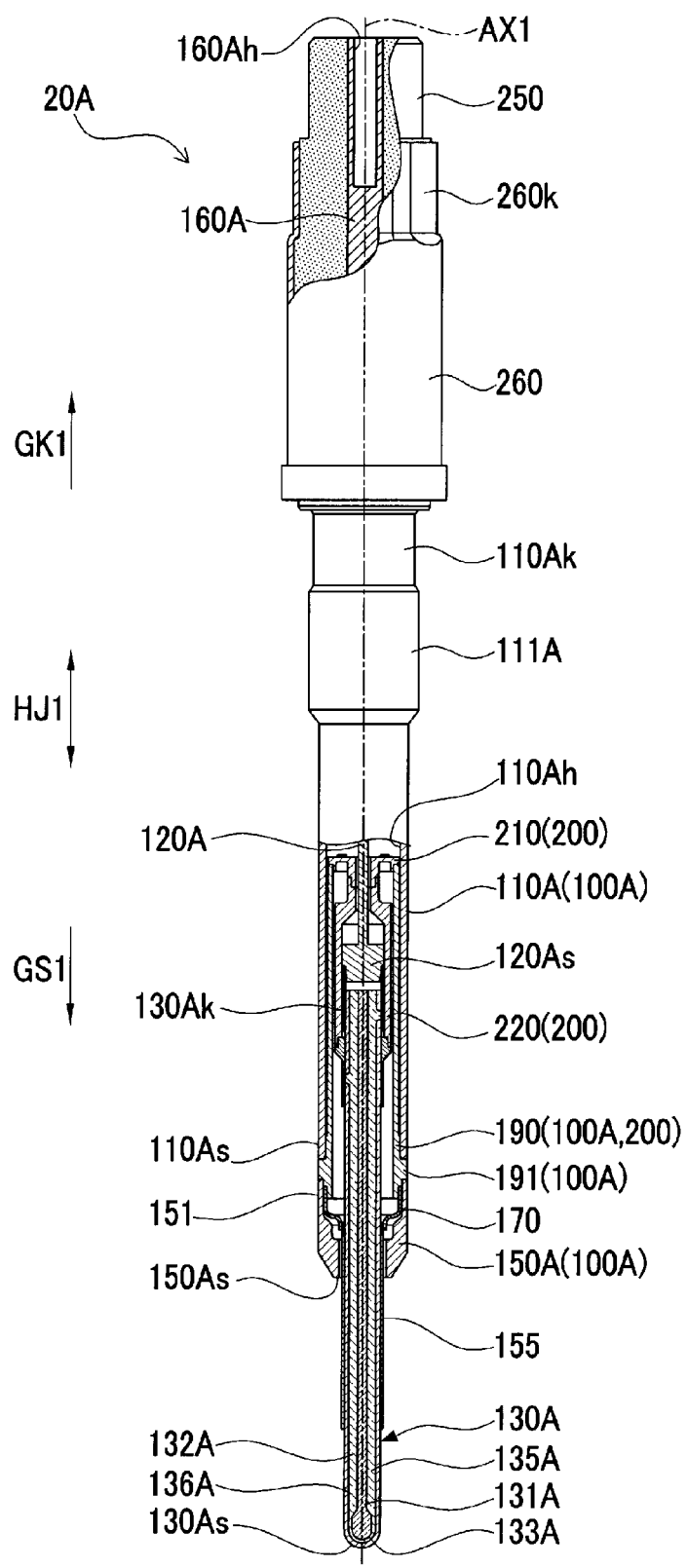
FIG. 2 is a partially cutaway sectional view showing a combustion pressure sensor incorporated glow plug.
Figure 3:
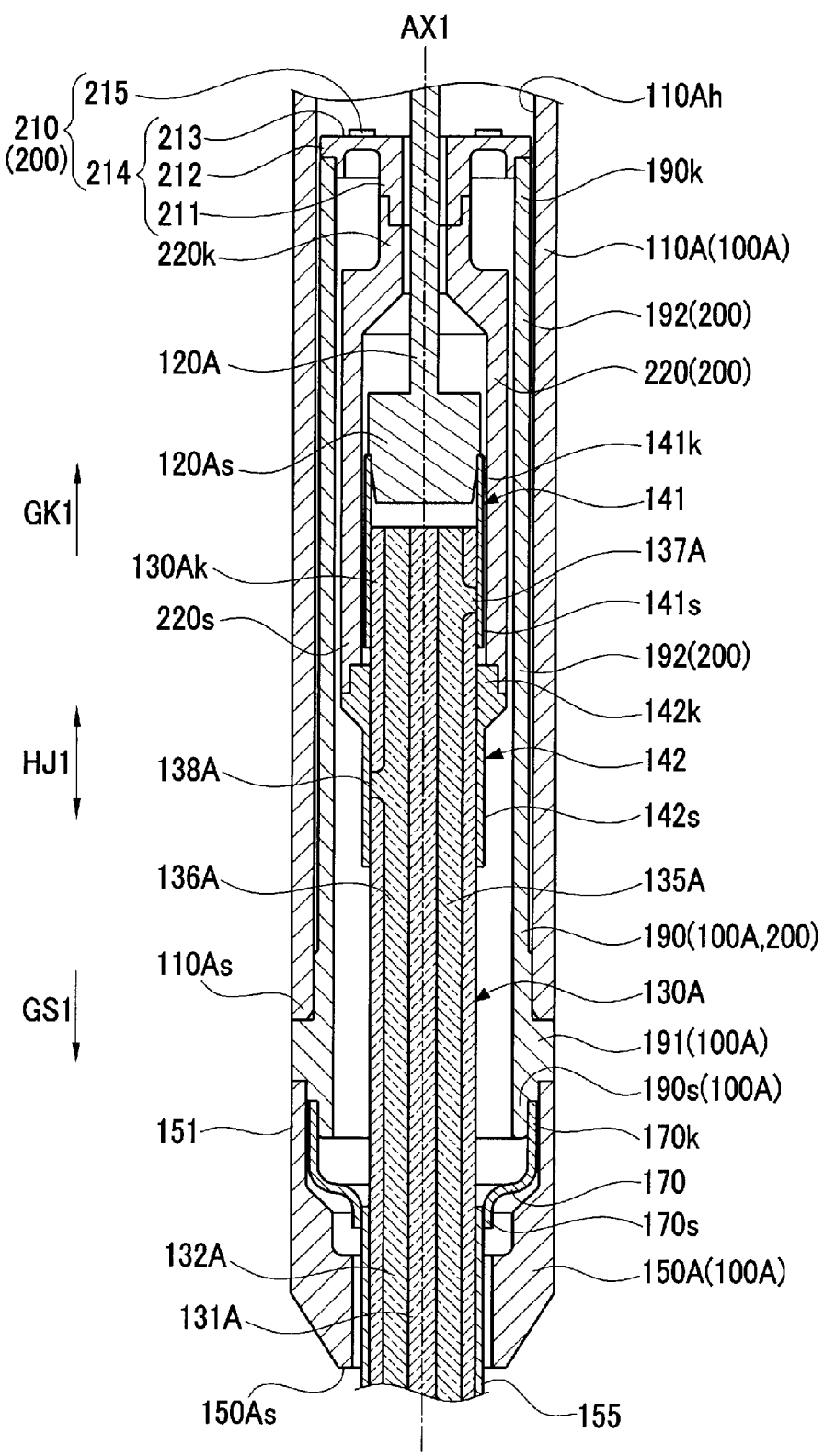
FIG. 3 is a fragmentary enlarged sectional view of the combustion pressure sensor incorporated glow plug.
Figure 4:
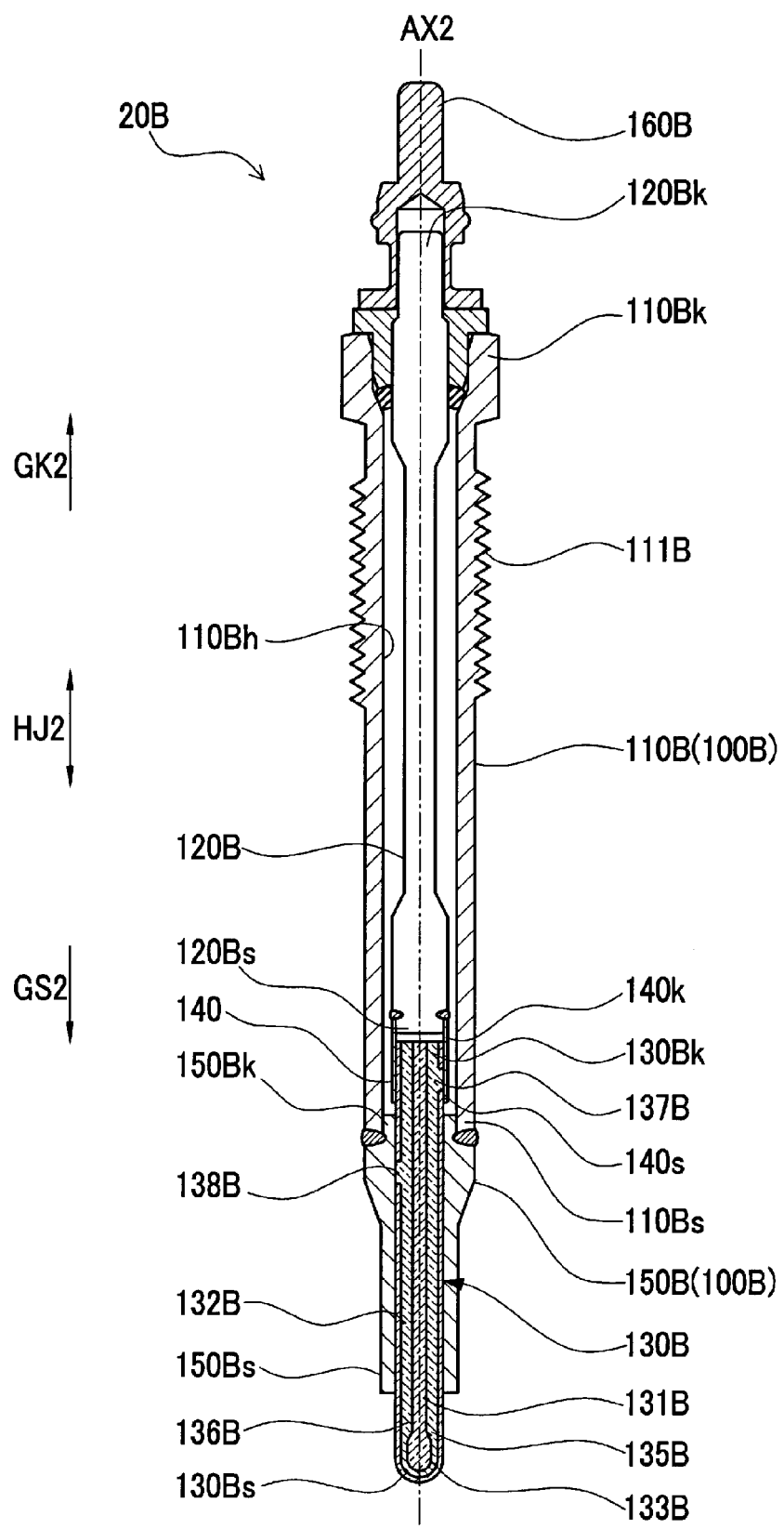
FIG. 4 is a vertical sectional view showing a sensor nonincorporated glow plug.

FIG. 2 is a general view showing the combustion pressure sensor incorporated glow plug 20A (hereinafter, referred to merely as the sensor incorporated plug 20A) to be mounted to the cylinder 11A, and FIG. 3 is a fragmentary enlarged sectional view of the sensor incorporated plug 20A. FIG. 4 is a general view showing a sensor nonincorporated glow plug 20B (hereinafter, referred to merely as the plug 20B) to be mounted to the cylinders 11B to 11D. As shown in FIG. 1, the sensor incorporated plug 20A and the plugs 20B are mounted to the cylinders 11A to 11D, respectively, in such a condition that heater forward end portions 130As and 130Bs of their heaters 130A and 130B protrude into combustion chambers 10a to 10d, respectively. The sensor incorporated plug 20A and the plugs 20B are utilized as heat sources for assisting in ignition at the time of engine start-up. Additionally, the sensor incorporated plug 20A detects combustion pressure in the combustion chamber 10a of the cylinder 11A to which the same is mounted.

First, of the sensor incorporated plug 20A and the plug 20B, the plug 20B having no pressure sensor will be described with respect to overall structure with reference to FIG. 4.

The plug 20B includes a metallic shell 110B, a heater 130B, a shaft 120B, a ring member 140, an outer tube 150B, and a pin terminal 160B. The metallic shell 110B and the outer tube 150B are united together, thereby forming a housing 100B of the plug 20B.

In the following description, a side toward the heater 130B (lower side in FIG. 4) of an axial direction HJ2 along an axial line AX2 of the plug 20B is referred to as a forward side GS2 of the plug 20B, and an opposite side (upper side in FIG. 4) is referred to as a rear side GK2 of the plug 20B.

The metallic shell 110B is a major portion of the housing 100B; is formed of a metal material; and assumes a tubular form extending in the axial direction HJ2 from its metallic-shell forward end portion 110Bs to a metallic-shell rear end portion 110Bk. The metallic shell 110B has an axial hole 110Bh extending therethrough. Also, the metallic shell 110B has an externally threaded portion 111B adapted for mounting use and formed on its outer circumferential surface at the rear side GK2.

The shaft 120B is formed of carbon steel and assumes a rodlike form extending in the axial direction HJ2 from its shaft forward end portion 120Bs to its shaft rear end portion 120Bk. The shaft 120B is inserted into the metallic shell 110B in such a condition that the shaft rear end portion 120Bk protrudes from the metallic-shell rear end portion 110Bk toward the rear side GK2. Also, the shaft forward end portion 120Bs is fitted into a ring rear end portion 140k, which will be described later, of the ring member 140.

The heater 130B assumes a rodlike form extending in the axial direction HJ2 from its heater forward end portion 130Bs to its heater rear end portion 130Bk. The heater 130B is inserted into the metallic shell 110B in such a condition that the heater forward end portion 130Bs, which generates heat through energization, protrudes from the metallic-shell forward end portion 110Bs toward the forward side GS2. The heater 130B is a ceramic heater having the following structure: a heat-generating resistor 132B formed of electrically conductive ceramic (specifically, silicon-nitride ceramic which contains tungsten carbide as an electrically conductive component) is embedded in a rodlike insulating substrate 131B formed of insulating ceramic (specifically, silicon-nitride ceramic).

The heat-generating resistor 132B has a heat-generating portion 133B and a pair of lead portions 135B and 136B. The heat-generating portion 133B is bent to a shape resembling the letter U and is disposed in the heater forward end portion 130Bs. The two lead portions 135B and 136B are connected to the respective opposite ends of the U-shaped heat-generating portion 133B and extends to the rear end surface of the heater rear end portion 130Bk. The lead portions 135B and 136B have electrode lead-out portions 137B and 138B, respectively. Specifically, the lead portion 135B has the electrode lead-out portion 137B formed at the heater rear end portion 130Bk. The electrode lead-out portion 137B is exposed at the outer circumference of the heater rear end portion 130Bk and is electrically connected to the ring member 140, which will be described next. Also, the lead portion 136B has the electrode lead-out portion 138B formed on the forward side GS2 with respect to the electrode lead-out portion 137B. The electrode lead-out portion 138B is exposed at the outer circumference of the heater 130B and is connected to the outer tube 150B, which will be described later.

The ring member 140 is formed of stainless steel and assumes a thin-walled cylindrical form extending in the axial direction HJ2 from its ring forward end portion 140s to its ring rear end portion 140k. The ring member 140 is disposed within the metallic shell 110B and connects the shaft 120B and the heater 130B.

The heater rear end portion 130Bk of the heater 130B is press-fitted into the ring forward end portion 140s of the ring member 140; as a result, the electrode lead-out portion 137B of the heater 130B comes into contact with the ring member 140 from inside, whereby an electrical connection is established therebetween.

Meanwhile, the shaft forward end portion 120Bs of the shaft 120B is press-fitted into the ring rear end portion 140k of the ring member 140, whereby an electrical connection is established between the ring member 140 and the shaft 120B. Furthermore, the ring member 140 and the shaft 120B are fixedly welded to each other.

The outer tube 150B is formed of stainless steel and assumes a tubular form extending in the axial direction HJ2 from its outer-tube forward end portion 150Bs to its outer-tube rear end portion 150Bk. The heater 130B is press-fitted into the outer tube 150B in such a condition that the heater forward end portion 130Bs protrudes from the outer-tube forward end portion 150Bs toward the forward side GS2 and that the heater rear end portion 130Bk protrudes from the outer-tube rear end portion 150Bk toward the rear side GK2. The electrode lead-out portion 138B of the heater 130B comes into contact with the outer tube 150B from inside, whereby the outer tube 150B and the electrode lead-out portion 138B are electrically connected to each other.

The outer-tube rear end portion 150Bk of the outer tube 150B is reduced in diameter and is fitted into the metallic-shell forward end portion 110Bs of the metallic shell 110B. The outer tube 150B and the metallic shell 110B are fixedly welded to each other. Thus, the metallic shell 110B and the outer tube 150B are integrated with each other, thereby forming the housing 100B. The heater 130B is held to the metallic-shell forward end portion 110Bs of the metallic shell 110B through the outer tube 150B.

The pin terminal 160B is fixed to the shaft rear-end portion 120Bk of the shaft 120B by circumferential crimping. As shown in FIG. 1, a connector cap 80 connected to an electricity supply cable 300B including an electricity supply line 310B is fitted to the pin terminal 160B, whereby the pin terminal 160B is connected to the electricity supply line 310B of the electricity supply cable 300B.

In the first embodiment and second to fourth embodiments, which will be described later, the heater 130B corresponds to the second heater in the present invention, the housing 100B corresponds to the second housing. Also, the pin terminal 160B corresponds to the second external terminal, and the shaft 120B corresponds to the second shaft. Furthermore, the electricity supply line 310B corresponds to the second electricity supply line, and the electricity supply cable 300B corresponds to the second electricity supply cable.

Also, the pin terminal 160B (second external terminal), the shaft 120B (second shaft), and the ring member 140 constitute a second electrically conductive member 40B which electrically connects the electricity supply line 310B (second electricity supply line) to the heater 130B (second heater) (see FIGS. 6, 9, 12, and 15). Also, a second residual section 50B is a section which remains after eliminating the second electrically conductive member 40B from the plug 20B and encompasses the heater 130B (second heater) (specifically, encompasses not only the heater 130B but also the housing 100B).

Next, the overall structure of the sensor incorporated plug 20A will be described with reference to FIGS. 2 and 3. The sensor incorporated plug 20A includes a metallic shell 110A, a shaft 120A, a heater 130A, a first ring member 141, a second ring member 142, a heater sheath 155, a forward end cap 150A, an inner tube 190, a membrane 170, a pressure sensor 200, a terminal assembly 250, and an external connection terminal 160A. The metallic shell 110A, and a flange portion 191 and a forward end portion 190s of the inner tube 190, and the forward end cap 150A are united together to form a housing 100A of the sensor incorporated plug 20A. Also, the pressure sensor 200 includes not only a sensor body 210 but also a transmission sleeve 220, and an inner-tube body 192 of the inner tube 190 adapted to fix the sensor body 210 to the inside of the housing 100A (metallic shell 110A).

In the following description, a side toward the heater 130A (lower side in FIG. 2) of an axial direction HJ1 along an axial line AX1 of the sensor incorporated plug 20A is referred to as a forward side GS1 of the sensor incorporated plug 20A, and an opposite side (upper side in FIG. 2) is referred to as a rear side GK1 of the sensor incorporated plug 20A.

The metallic shell 110A is a major portion of the housing 100A; is formed of a metal material; and assumes a tubular form extending in the axial direction HJ1 from its metallic-shell forward end portion 110As to a metallic-shell rear end portion 110Ak. The metallic shell 110A has an axial hole 110Ah formed therein. Also, the metallic shell 110A has an externally threaded portion 111A adapted for mounting use and formed on its outer circumferential surface at the rear side GK1.

The inner-tube body 192 of the inner tube 190 assumes a substantially cylindrical form and is disposed concentrically in the axial hole 110Ah of the metallic shell 110A at the forward side GS1 with respect to the axial direction HJ1. The inner-tube body 192 has the collar-like flange portion 191 protruding radially outward and formed at the forward side GS1 with respect to the axial direction HJ1. The flange portion 191 has the same outside diameter as that of the metallic-shell forward end portion 110As of the metallic shell 110A and partially constitutes the housing 100A. The flange portion 191 is welded to the metallic-shell forward end portion 110As of the metallic shell 110A. Also, an annular outer circumferential portion 212 of the sensor body 210 is welded to a rear end portion 190k of the inner tube 190.

The forward end cap 150A is formed of a metal material and has a cylindrical portion 151 formed at its rear side GK1. The cylindrical portion 151 is externally fitted to the forward end portion 190s of the inner tube 190 and is welded to the flange portion 191 of the inner tube 190.

The cylindrical portion 151 accommodates therein the membrane 170 which connects the heater 130A and the forward end portion 190s of the inner tube 190.

The shaft 120A is formed of carbon steel and assumes a rodlike form extending from its shaft forward end portion 120As toward the rear side GK1 with respect to the axial direction HJ1. The shaft forward end portion 120As has an increased diameter and is fitted into a ring rear end portion 141k of the first ring member 141, which will be described later.

The heater 130A assumes a rodlike form extending in the axial direction HJ1 from its heater rear end portion 130Ak to its heater forward end portion 130As. The heater 130A is inserted into the forward end cap 150A, the inner tube 190, and the metallic shell 110A in such a condition that the heater forward end portion 130As, which generates heat through energization, protrudes from a forward end 150As of the forward end cap 150A toward the forward side GS1. The heater 130A is a ceramic heater having the following structure: a heat-generating resistor 132A formed of electrically conductive ceramic (specifically, silicon-nitride ceramic which contains tungsten carbide as an electrically conductive component) is embedded in a rodlike insulating substrate 131A formed of insulating ceramic (specifically, silicon-nitride ceramic).

The heat-generating resistor 132A has a heat-generating portion 133A and a pair of lead portions 135A and 136A. The heat-generating portion 133A is bent to a shape resembling the letter U and is disposed in the heater forward end portion 130As. The two lead portions 135A and 136A are connected to the respective opposite ends of the U-shaped heat-generating portion 133A and extends to the rear end surface of the heater rear end portion 130Ak. The lead portions 135A and 136A have electrode lead-out portions 137A and 138A, respectively. Specifically, the lead portion 135A has the electrode lead-out portion 137A formed at the heater rear end portion 130Ak. The electrode lead-out portion 137A is exposed at the outer circumference of the heater rear end portion 130Ak and is electrically connected to the first ring member 141, which will be described next. Also, the lead portion 136A has the electrode lead-out portion 138A formed on the forward side GS1 with respect to the electrode lead-out portion 137A. The electrode lead-out portion 138A is exposed at the outer circumference of the heater 130A and is connected to the second ring member 142, which will be described later.

The first ring member 141 is formed of stainless steel and assumes a thin-walled cylindrical form extending in the axial direction HJ1 from its ring forward end portion 141s to its ring rear end portion 141k. The first ring member 141 is disposed within the metallic shell 110A and connects the shaft 120A and the heater 130A.

The heater rear end portion 130Ak of the heater 130A is press-fitted into the ring forward end portion 141s of the first ring member 141; as a result, the electrode lead-out portion 137A of the heater 130A comes into contact with the first ring member 141 from inside, whereby an electrical connection is established therebetween.

Meanwhile, the shaft forward end portion 120As of the shaft 120A is press-fitted into the ring rear end portion 141k of the first ring member 141, whereby an electrical connection is established between the first ring member 141 and the shaft 120A. Furthermore, the first ring member 141 and the shaft 120A are fixedly welded to each other.

The second ring member 142 is formed of stainless steel and assumes a cylindrical form extending in the axial direction HJ1 from its ring forward end portion 142s to its ring rear end portion 142k. The ring forward end portion 142s assumes a thin-walled cylindrical form, and the ring rear end portion 142k is greater in wall thickness than the ring forward end portion 142s and has an increased outside diameter.

The heater 130A is press-fitted into the second ring member 142 such that the electrode lead-out portion 138A of the heater 130A is located in the ring forward end portion 142s of the second ring member 142; as a result, the electrode lead-out portion 138A comes into contact with the second ring member 142 from inside, whereby an electrical connection is established therebetween.

Meanwhile, the large-diameter ring rear end portion 142k of the second ring member 142 is welded to a sleeve forward end portion 220s of the transmission sleeve 220, which will be described later, thereby being connected to the transmission sleeve 220.

Also, a portion of the heater 130A located at the forward side GS1 is pressed-fitted into the cylindrical heater sheath 155 formed of stainless steel. The heater sheath 155 is externally fitted to the heater 130A to hold the heater 130A, and joins the heater 130A whose outer surface is formed of ceramic, to the membrane 170, which will be described next.

The membrane 170 is formed of, for example, stainless steel or a nickel alloy, and is elastic in the axial direction HJ1. The membrane 170 assumes a two-step cylindrical form such that its forward end portion 170s is reduced in diameter, whereas its rear end portion 170k is increased in diameter. The large-diameter rear end portion 170k is welded to the forward end portion 190s of the inner tube 190, whereas the small-diameter forward end portion 170s is welded to the outer circumferential surface of the heater sheath 155 externally fitted to the heater 130A.

Thus, the heater sheath 155 externally fitted to the heater 130A, and the forward end portion 190s of the inner tube 190 are elastically connected to each other through the membrane 170, whereby the heater 130A is held by the housing 100A and is allowed to move in the axial direction HJ1 by virtue of elasticity of the membrane 170. As will be described next, the displacement of the heater 130A in the axial direction HJ1 is transmitted to the sensor body 210 by the transmission sleeve 220 integrated with the heater 130A.

The transmission sleeve 220 of the pressure sensor 200 is formed of a metal material and assumes a substantially cylindrical form. The sleeve forward end portion 220s is welded to the second ring member 142 externally fitted to the heater 130A to be integrated with the second ring member 142. In this manner, the transmission sleeve 220, together with the heater 130A, is accommodated in the inner tube 190 of the housing 100A and electrically communicates with the electrode lead-out portion 138A of the heater 130A through the second ring member 142. A rear end portion 220k of the transmission sleeve 220 is engaged with an annular inner circumferential portion 211 of the sensor body 210. The transmission sleeve 220 transmits displacement in the axial direction HJ1 of the heater 130A to the inner circumferential portion 211 of the sensor body 210.

The housing 100A and the electrode lead-out portion 138A of the heater 130A electrically communicate with each other through the second ring member 142, the transmission sleeve 220 of the pressure sensor 200, the sensor body 210, and the inner-tube body 192.

The sensor body 210 is configured such that a plurality of pressure detection elements 215 formed of respective piezoresistors are disposed on a diaphragm portion 213 of an annular diaphragm body 214 formed of a metal material. The sensor body 210 detects combustion pressure as follows: the diaphragm portion 213 of the diaphragm body 214 is deformed in response to displacement in the axial direction HJ1 of the heater 130A transmitted by the transmission sleeve 220.

The diaphragm body 214 of the sensor body 210 is composed of the substantially cylindrical inner and outer circumferential portions 211 and 212, respectively, and the thin-walled annular diaphragm portion 213 extending therebetween. The shaft 120A is inserted through the inner circumferential portion 211 with an annular clearance therebetween. The outer circumferential portion 212 is engaged with the rear end portion 190k of the inner tube 190, and the inner circumferential portion 211 is engaged with the rear end portion 220k of the transmission sleeve 220.

The pressure detection elements 215 are disposed on the annular diaphragm portion 213. The pressure detection elements 215 vary in resistance according to the degree of deformation; i.e., the degree of strain, of the diaphragm portion 213.

A tubular terminal cover 260 of metal is welded to the metallic-shell rear end portion 110Ak of the metallic shell 110A of the housing 100A. The terminal assembly 250 is accommodated in the terminal cover 260 in such a condition that a portion of the terminal assembly 250 protrudes toward the rear side GK1 along the axial direction HJ1 from a rear end portion 260k of the terminal cover 260.

The external connection terminal 160A, which electrically communicates with the heater 130A and the shaft 120A, is disposed within the terminal assembly 250. The external connection terminal 160A has a connection hole 160Ah, and, as shown in FIG. 1, an electricity supply cable 300A encompassing an electricity supply line 310A is connected to the external connection terminal 160A.

In the present first embodiment, and the second to fourth embodiments, which will be described later, the heater 130A corresponds to the first heater in the present invention, and the housing 100A corresponds to the first housing. Also, the external connection terminal 160A corresponds to the first external terminal, and the shaft 120A corresponds to the first shaft. Furthermore, the electricity supply line 310A corresponds to the first electricity supply line, and the electricity supply cable 300A corresponds to the first electricity supply cable.

Also, the external connection terminal 160A (first external terminal), the shaft 120A (first shaft), and the first ring member 141 constitute a first electrically conductive member 40A which establishes electrical communication between the electricity supply line 310A (first electricity supply line) and the heater 130A (first heater) (see FIGS. 6, 9, 12, and 15). A first residual section 50A is a section which remains after eliminating the first electrically conductive member 40A from the sensor incorporated plug 20A and which encompasses the heater 130A (first heater) (specifically, encompassing the heater 130A, the housing 100A, the pressure sensor 200, etc.).

As mentioned above, in the internal combustion engine 1 of the present first embodiment shown in FIG. 1, the sensor incorporated plug 20A having the pressure sensor 200 for detecting combustion pressure is mounted to the cylinder 11A of four cylinders 11A to 11D of the engine body 10, whereas the plugs 20B are mounted to the remaining three respective cylinders 11B to 11D.

Figure 5:
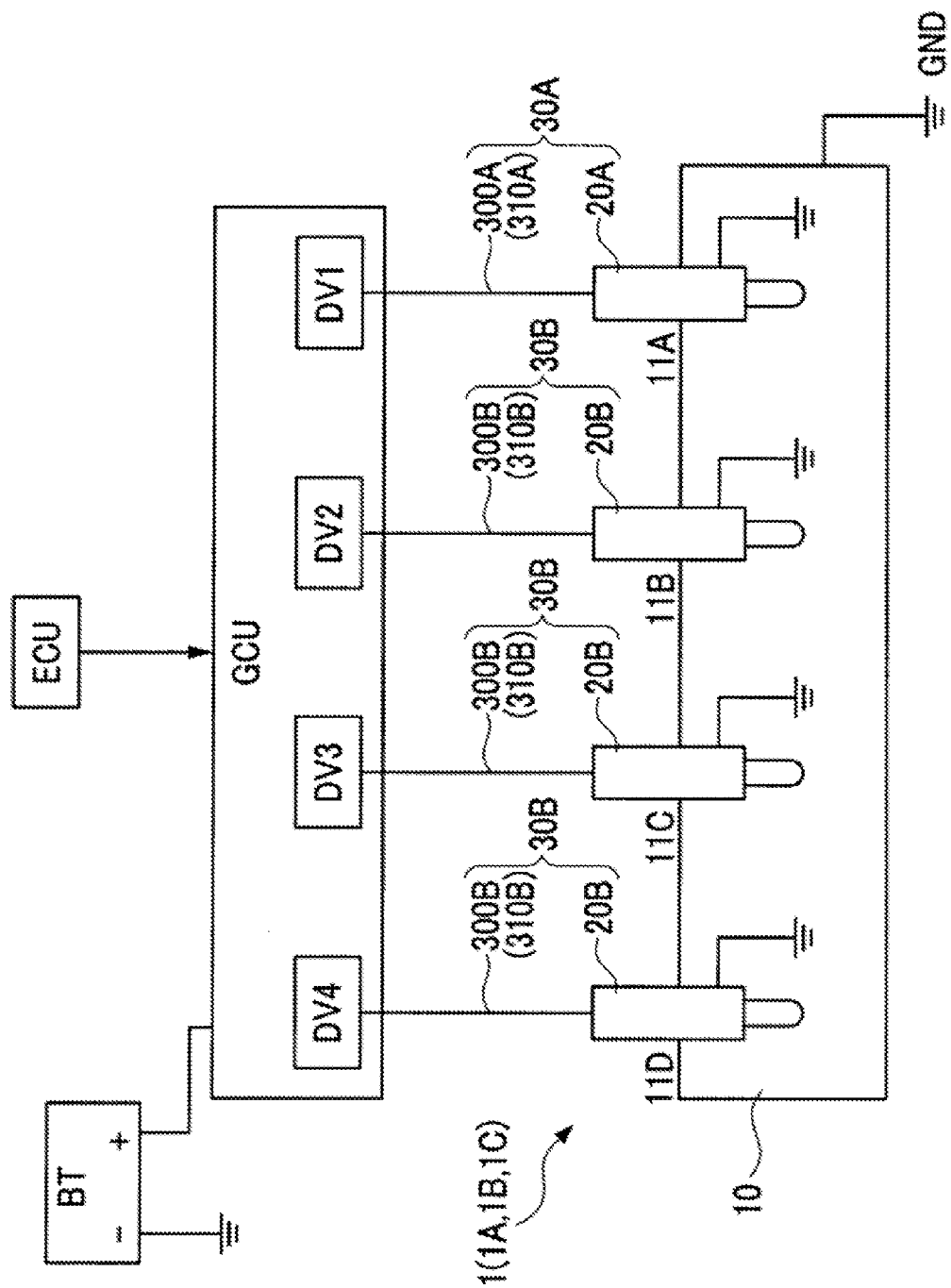
FIG. 5 is an explanatory view showing connections between glow plugs and a glow plug control unit which includes drive circuits for driving the respective glow plugs in the internal combustion engines according to the first to fourth embodiments.

As shown in FIG. 5, the sensor incorporated plug 20A and the plugs 20B are connected to four drive circuits DV1 to DV4, respectively, of a glow plug control unit (GCU) through the electricity supply cables 300A and 300B encompassing the electricity supply lines 310A and 310B. Also, the GCU is connected to an external power supply BT (battery) mounted in a vehicle. Voltage applied from the external power supply BT is pulse-driven by the drive circuits DV1 to DV4 and is then output from the GCU. Furthermore, the housings 100A and 100B of the sensor incorporated plug 20A and the plugs 20B are connected to a reference potential GND through the engine body 10.

Thus, electricity from the external power supply BT is supplied to the heaters 130A and 130B of the sensor incorporated plug 20A and the plugs 20B through the drive circuits DV1 to DV4 and the electricity supply lines 310A and 310B of the electricity supply cables 300A and 300B.

As shown in FIGS. 1 and 5, a first structure 30A is an overall structure composed of the sensor incorporated plug 20A and the electricity supply cable 300A connected to the sensor incorporated plug 20A, and a second structure 30B is an overall structure composed of the plug 20B and the electricity supply cable 300B connected to the plug 20B. The first structure 30A and the second structure 30B correspond to the first section and the second section, respectively, in the present invention.

As shown in FIG. 5, the GCU is connected to an electronic control unit (ECU) and controls electricity supply to the glow plugs under instructions from the ECU. However, since the ECU issues a single instruction, the GCU performs the same control on the four drive circuits DV1 to DV4; specifically, the GCU pulse-drives the drive circuits DV1 to DV4 at the same duty ratio. Thus, the drive circuits DV1 to DV4 supply electricity, at the same duty ratio (effective applied voltage), to the first structure 30A composed of the sensor incorporated plug 20A mounted to the cylinder 11A and the electricity supply cable 300A connected to the sensor incorporated plug 20A, and to the second structures 30B composed of the plugs 20B mounted to the cylinders 11B to 11D and the electricity supply cables 300B connected to the plugs 20B.

As shown in FIGS. 6, 9, 12, and 15, in view of electricity, the sensor incorporated plug 20A, the plugs 20B, and the electricity supply cables 300A and 300B (electricity supply lines 310A and 310B) connected to the plugs 20A and 20B are a plurality of resistances connected in series. The drive circuits DV1 to DV4 apply voltage to resistances of the members.

In the present first embodiment, and the second to fourth embodiments, which will be described later, a first section voltage $Vc1$ is a voltage which the drive circuit DV1 applies to the first structure 30A (first section) composed of the sensor incorporated plug 20A and the electricity supply cable 300A. A second section voltage $Vc2$ is a voltage which the drive circuit DV2 (DV3, DV4) applies to the second structure 30B (second section) composed of the plug 20B and the electricity supply cable 300B.

The first voltage Vc1 is a voltage at the output terminal of the drive circuit DV1 connected to the electricity supply line 310A, with respect to the reference potential GND to which the housing 100A of the sensor incorporated plug 20A is connected. Also, the second voltage Vc2 is a voltage at the output terminal of the drive circuit DV2 (DV3, DV4) connected to the electricity supply line 310B, with respect to the reference potential GND to which the housing 100B of the plug 20B is connected.

Also, a first plug voltage Vp1 is a voltage applied to the sensor incorporated plug 20A, and a second plug voltage Vp2 is a voltage applied to the plug 20B.

The first plug voltage Vp1 is a voltage applied to the external connection terminal 160A with respect to the reference potential GND to which the housing 100A of the sensor incorporated plug 20A is connected. Also, the second plug voltage Vp2 is a voltage applied to the pin terminal 160B with respect to the reference potential GND to which the housing 100B of the plug 20B is connected.

Furthermore, a first residual section voltage Vz1 is a voltage applied to the first residual section 50A which remains after eliminating the first electrically conductive member 40A from the sensor incorporated plug 20A, at the time when the first plug voltage Vp1 is applied to the sensor incorporated plug 20A. Also, a second residual section voltage Vz2 is a voltage applied to the second residual section 50B which remains after eliminating the second electrically conductive member 40B from the plug 20B, at the time when the second plug voltage Vp2 is applied to the plug 20B.

The first residual section voltage Vz1 corresponds to a voltage at the first ring member 141 with respect to the reference potential GND to which the housing 100A of the sensor incorporated plug 20A is connected, at the time when the first plug voltage Vp1 is applied to the external connection terminal 160A. Also, the second residual section voltage Vz2 corresponds to a voltage at the ring member 140 with respect to the reference potential GND to which the housing 100B of the plug 20B is connected, at the time when the second plug voltage Vp2 is applied to the pin terminal 160B. The first residual section voltage Vz1 and the second residual section voltage Vz2 can be theoretically obtained from the relations between the first and second plug voltages Vp1 and Vp2 and resistances of members measured beforehand and also can be actually measured, for example, by the following method: the housing 100A (100B) is drilled, and voltage of the first ring member 141 (ring member 140) with respect to the reference potential GND is measured through the drilled hole.

Figure 6:
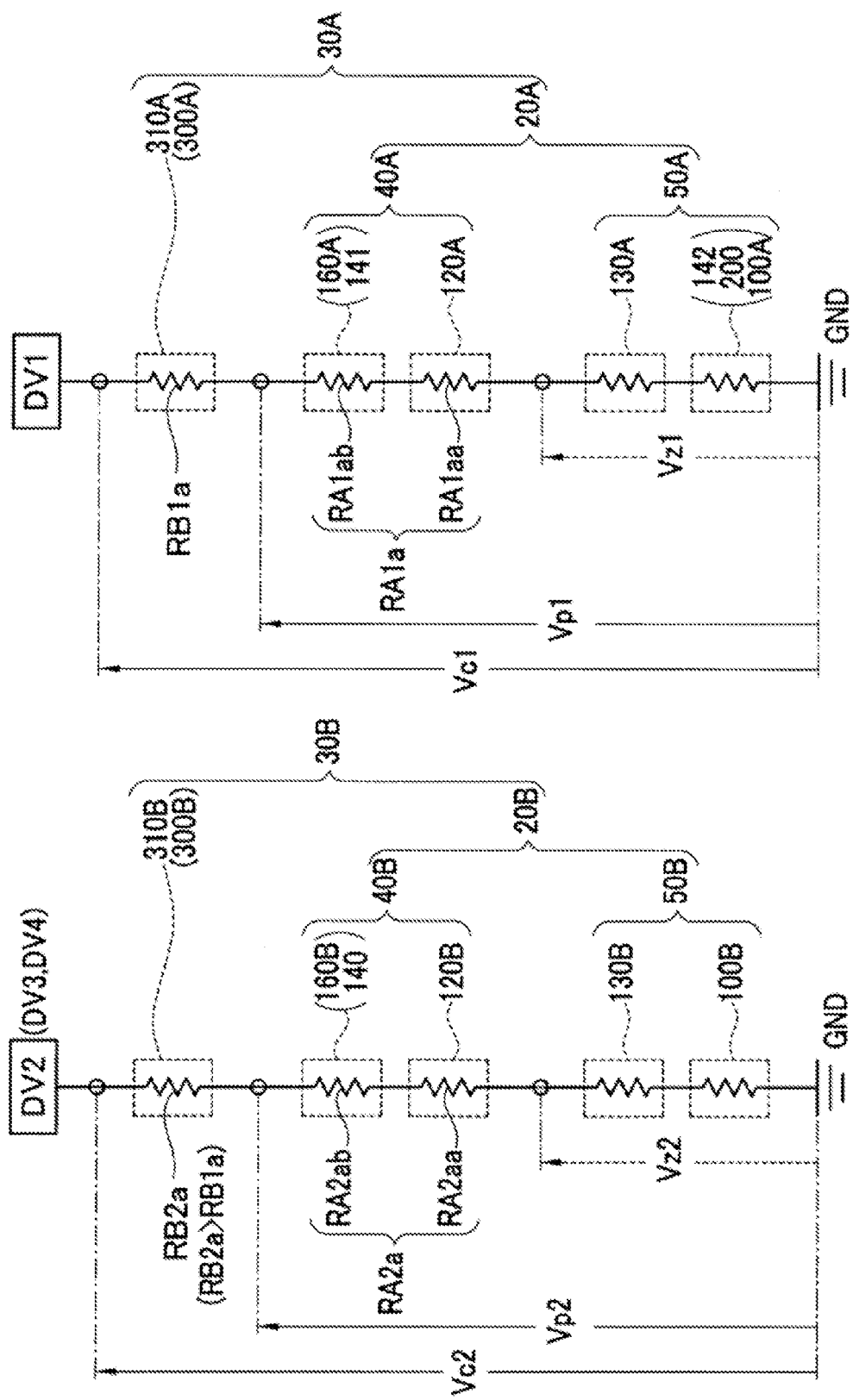
FIG. 6 is an explanatory view for explaining resistances of members of glow plugs and cables and applied voltages in a first embodiment of the present invention.

Also, in the present first embodiment, as shown in FIG. 6, RB1$a$ is resistance of the electricity supply line 310A (first electricity supply line) connected to the sensor incorporated plug 20A. RB2$a$ is resistance of the electricity supply line 310B (second electricity supply line) connected to the plug 20B.

Also, RA1$a$ is resistance of the first electrically conductive member 40A composed of the external connection terminal 160A (first external terminal), the shaft 120A (first shaft), and the first ring member 141 in the sensor incorporated plug 20A. RA2$a$ is resistance of the second electrically conductive member 40B composed of the pin terminal 160B (second external terminal), the shaft 120B (second shaft), and the ring member 140 in the plug 20B.

Also, resistance RA1$a$ of the first electrically conductive member 40A consists of resistance RA1$aa$ of the shaft 120A (first shaft) and total resistance RA1$ab$ of the external connection terminal 160A and the first ring member 141. Resistance RA2$a$ of the second electrically conductive member 40B consists of resistance RA2$aa$ of the shaft 120B (second shaft) and total resistance RA$ab$ of the pin terminal 160B and the ring member 140.

Meanwhile, since the sensor incorporated plug 20A and the plug 20B differ in structure, although the heater 130A (first heater) of the sensor incorporated plug 20A and the heater 130B (second heater) of the plug 20B are ceramic heaters in common, the heater 130A and the heater 130B differ in energization characteristic.

Figure 7:
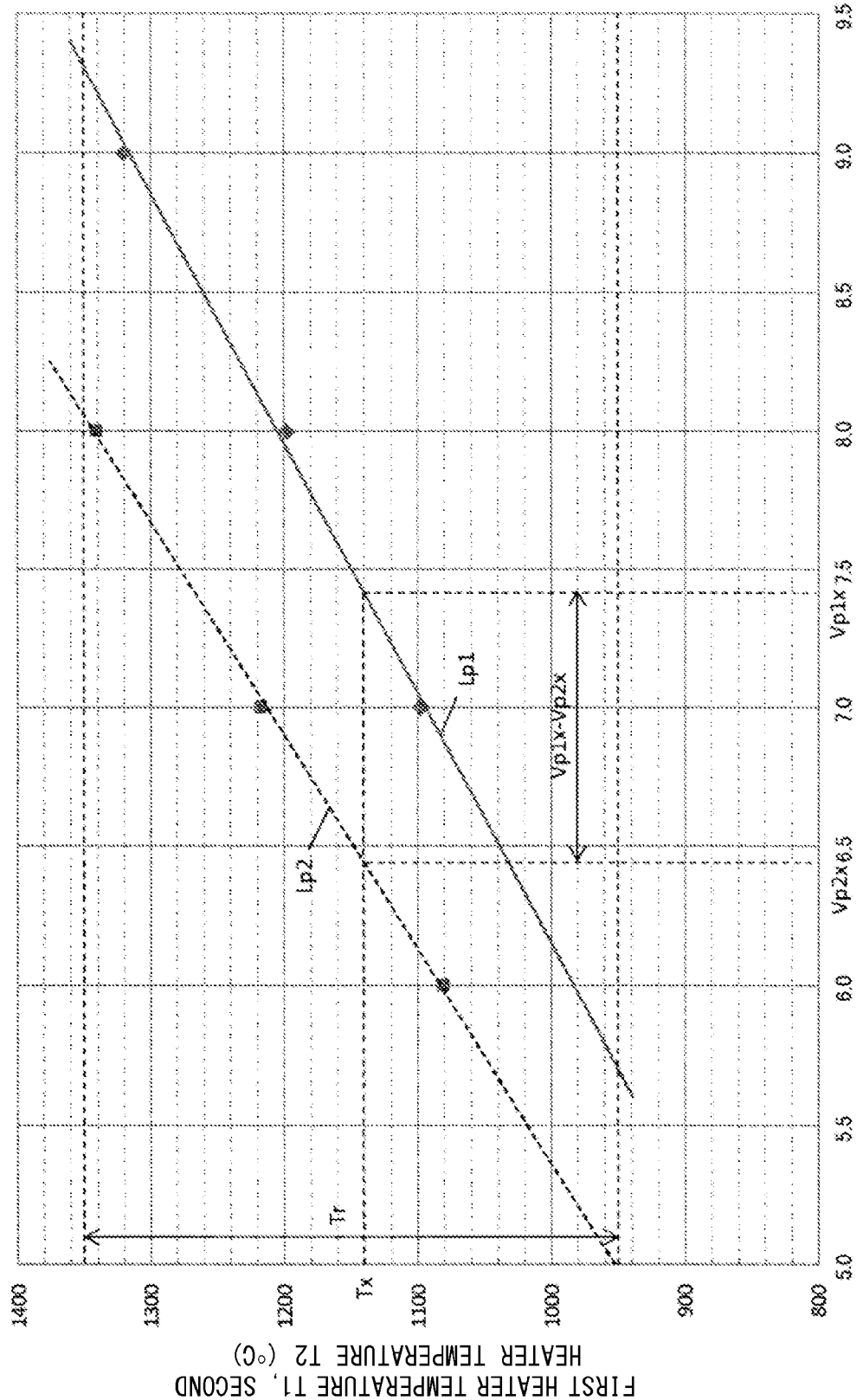
FIG. 7 is a graph showing relations between voltages applied to glow plugs and temperatures of heat generated by heaters in the first embodiment.

Specifically, the sensor incorporated plug 20A and the plug 20B are in such a relation that a first plug voltage Vp1 (see FIG. 6) vs. first heater temperature T1 characteristic and a second plug voltage Vp2 (see FIG. 6) vs. second heater temperature T2 characteristic are represented by the graph of FIG. 7, where the first plug voltage Vp1 is applied to the sensor incorporated plug 20A, the second plug voltage Vp2 is applied to the plug 20B, the first heater temperature T1 is the temperature of heat generated by the heater 130A, and the second heater temperature T2 is the temperature of heat generated by the heater 130B. The first heater temperature T1 and the second heater temperature T2 in FIG. 7 are measured by use of a radiation thermometer.

A first plug regression line Lp1 represented by the solid line in FIG. 7 is drawn from a first plug voltage vs. temperature characteristic indicative of the relation, within a temperature range Tr of 950° C. to 1,350° C., between the first plug voltage Vp1 applied to the sensor incorporated plug 20A and the first heater temperature T1 indicative of the temperature of heat generated by the heater 130A (first heater). Also, a second plug regression line Lp2 represented by the broken line in FIG. 7 is drawn from a second plug voltage vs. temperature characteristic indicative of the relation, within the temperature range Tr, between the second plug voltage Vp2 applied to the plug 20B and the second heater temperature T2 indicative of the temperature of heat generated by the heater 130B (second heater).

Furthermore, as shown in FIG. 7, a first voltage Vp1$x$ is the first plug voltage Vp1 which corresponds, on the first plug regression line Lp1, to a predetermined temperature Tx of the first heater temperature T1 within the temperature range Tr. Also, a second voltage Vp2$x$ is the second plug voltage Vp2 which corresponds, on the second plug regression line Lp2, to the same predetermined temperature Tx of the second heater temperature T2. A first-second plug voltage difference (Vp1$x$−Vp2$x$) is the difference at the predetermined temperature Tx between the first voltage Vp1$x$ and the second voltage Vp2$x$. Then, the first plug regression line Lp1 and the second plug regression line Lp2 are in such a relation that, at any predetermined temperature Tx within the temperature range Tr, the second voltage Vp2$x$ is lower than the first voltage Vp1$x$ (Vp2$x$<Vp1$x$).

That is, as represented by the first plug regression line Lp1 and the second plug regression line Lp2 in FIG. 7, the sensor incorporated plug 20A and the plug 20B do not match in a heater energization characteristic indicative of the relation between voltages (first plug voltage Vp1 and second plug voltage Vp2) applied to the plugs and temperatures of heat generated by the heaters (first heater temperature T1 and second heater temperature T2). Also, in the case where the first heater temperature T1 and the second heater temperature T2 are to have the same temperature, a required second plug voltage Vp2 is lower than a required first plug voltage Vp1. In other words, in the case where the first plug voltage Vp1 and the second plug voltage Vp2 applied to the respective glow plugs have the same voltage, the second heater temperature T2 becomes higher than the first heater temperature T1.

Thus, when the drive circuits DV1 to DV4 (see FIG. 5) apply electricity to the sensor incorporated plug 20A and the plugs 20B at the same duty ratio (effective applied voltage), because of difference in energization characteristic between the heater 130A (first heater) of the sensor incorporated plug 20A and the heater 130B (second heater) of the plug 20B, the first heater temperature T1 and the second heater temperature T2 differ from each other (T2>T1); as a result, the cylinders are apt to differ in a glow plug action of assisting in start-up.

Thus, as shown in FIG. 6, in the internal combustion engine 1 of the present first embodiment, resistance RB2a of the electricity supply line 310B (second electricity supply line) connected to the plug 20B is rendered greater than resistance RB1a of the electricity supply line 310A (first electricity supply line) connected to the sensor incorporated plug 20A (RB2a>RB1a).

Specifically, the electricity supply line 310A (first electricity supply line) is formed of copper wire, whereas the electricity supply line 310B (second electricity supply line) is formed of nickel wire, which is higher in specific resistance (electric resistivity) than copper wire. Furthermore, the electricity supply line 310B (second electricity supply line) is smaller in cross-sectional area and longer in overall length than the electricity supply line 310A (first electricity supply line).

In the present first embodiment, the shaft 120A (first shaft) and the shaft 120B (second shaft) are formed of carbon steel. Also, in contrast to the second embodiment, which will be described later, resistance RA1aa of the shaft 120A and resistance RA2aa of the shaft 120B are substantially equal to each other, and resistance RA1a of the first electrically conductive member 40A and resistance RA2a of the second electrically conductive member 40B are substantially equal to each other.

Figure 8:
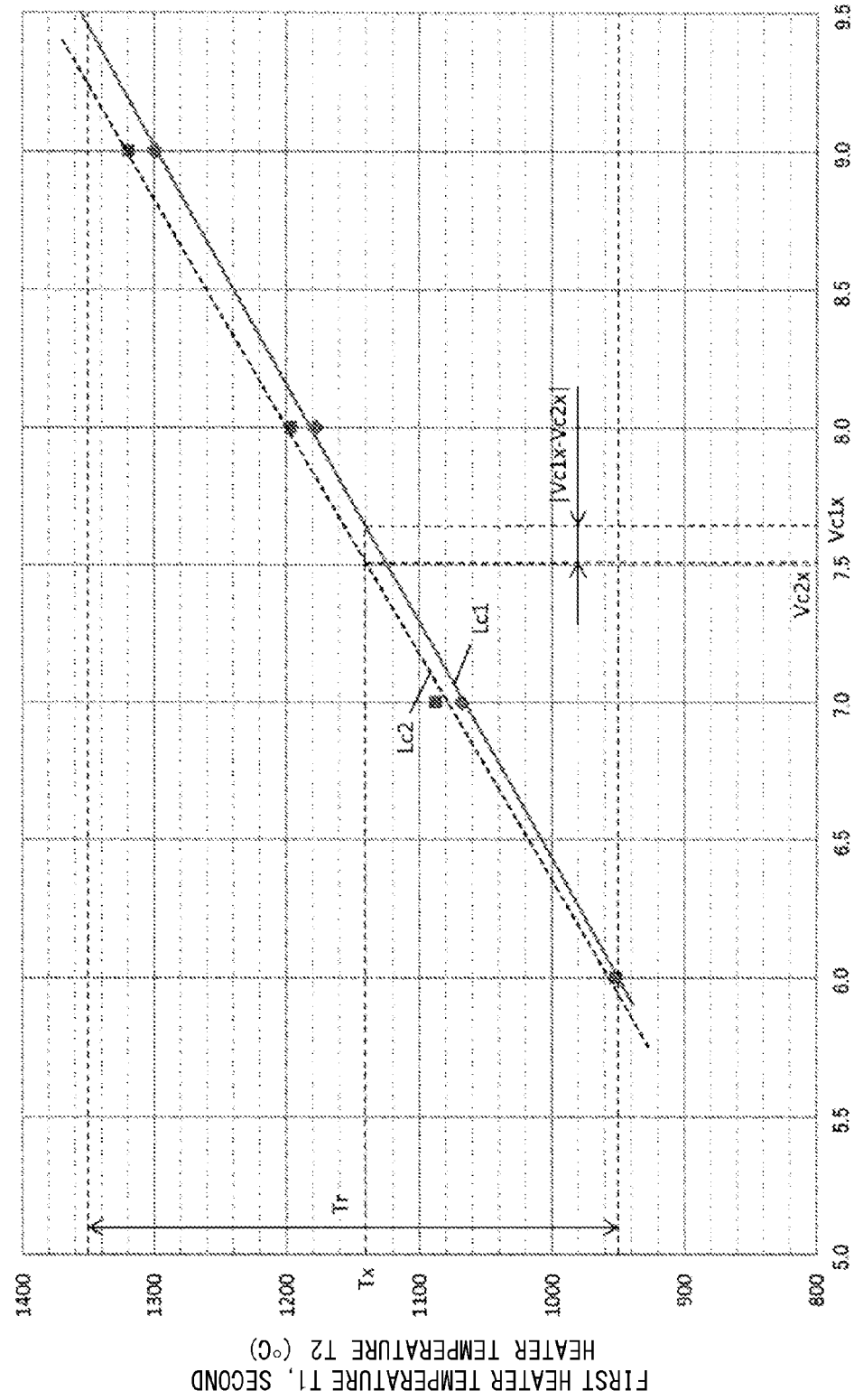
FIG. 8 is a graph showing relations between voltages applied to structures each consisting of a glow plug and an electricity supply cable and temperatures of heat generated by heaters in the first embodiment.

Thus, in the internal combustion engine 1 of the present first embodiment, the first structure 30A (first section) and the second structure 30B (second section) are in such a relation that a first section voltage Vc1 (see FIG. 6) vs. first heater temperature T1 characteristic and a second section voltage Vc2 (see FIG. 6) vs. second heater temperature T2 characteristic are represented by the graph of FIG. 8, where the first section voltage Vc1 is applied to the first structure 30A, and the second section voltage Vc2 is applied to the second structure 30B.

A first section regression line Lc1 represented by the solid line in FIG. 8 is drawn from a first section voltage vs. temperature characteristic indicative of the relation, within a temperature range Tr of 950° C. to 1,350° C., between the first section voltage Vc1 applied to the first structure 30A (first section) and the first heater temperature T1 indicative of the temperature of heat generated by the heater 130A (first heater). Also, a second section regression line Lc2 represented by the broken line in FIG. 8 is drawn from a second section voltage vs. temperature characteristic indicative of the relation, within the temperature range Tr, between the second section voltage Vc2 applied to the second structure 30B (second section) and the second heater temperature T2 indicative of the temperature of heat generated by the heater 130B (second heater).

Furthermore, as shown in FIG. 8, a third voltage Vc1x is the first section voltage Vc1 which corresponds, on the first section regression line Lc1, to the predetermined temperature Tx of the first heater temperature T1 within the temperature range Tr. Also, a fourth voltage Vc2x is the second section voltage Vc2 which corresponds, on the second section regression line Lc2, to the same predetermined temperature Tx of the second heater temperature T2. An overall voltage deviation |Vc1x−Vc2x| is an absolute value of the difference at the predetermined temperature Tx between the third voltage Vc1x and the fourth voltage Vc2x.

Then, the first section regression line Lc1 and the second section regression line Lc2 are in such a relation that, at any predetermined temperature Tx within the temperature range Tr, the overall voltage deviation |Vc1x−Vc2x| is smaller than the first-second plug voltage difference (Vp1x−Vp2x) in FIG. 7.

That is, deviation between the first section voltage Vc1 and the second section voltage Vc2 (absolute value of the difference between the two voltages) required for the first heater temperature T1 and the second heater temperature T2 to have the same temperature is smaller than the difference between the first plug voltage Vp1 and the second plug voltage Vp2.

As mentioned above, in the internal combustion engine 1 of the present first embodiment, resistance RB2a of the electricity supply line 310B (second electricity supply line) is rendered greater than resistance RB1a of the electricity supply line 310A (first electricity supply line). By virtue of this, as compared with the relation between energization characteristics of the heaters 130A and the 130B with respect to the glow plugs 20A and 20B, an energization characteristic (the relation between the first section voltage Vc1 and the first heater temperature T1) of the first structure 30A (first section) composed of the sensor incorporated plug 20A and the electricity supply cable 300A (first electricity supply cable) and an energization characteristic (the relation between the second section voltage Vc2 and the second heater temperature T2) of the second structure 30B (second section) composed of the plug 20B and the electricity supply cable 300B (second electricity supply cable) are closer to each other.

Thus, there can be yielded the internal combustion engine 1 in which, upon application of the same effective voltage from the drive circuits DV1 to DV4 to overall structures consisting of the electricity supply cables 300A and 300B and the glow plugs 20A and 20B, the difference in heater temperature among cylinders is restrained.

B. Second Embodiment

A second embodiment of the present invention will next be described with reference to the drawings. As shown in FIGS. 1 and 5, similar to the internal combustion engine 1 of the first embodiment described above, in an internal combustion engine 1A according to the second embodiment, of the four cylinders 11A to 11D of the engine body 10, the cylinder 11A has the sensor incorporated plug 20A mounted thereto, and the remaining three cylinders 11B to 11D each have the plug 20B mounted thereto and having no pressure sensor. The sensor incorporated plug 20A and the plugs 20B are connected to the four drive circuits DV1 to DV4, respectively, of the GCU through the electricity supply cables 300A and 300B encompassing the electricity supply lines 310A and 310B.

Similar to the first embodiment, the drive circuits DV1 to DV4 supply electricity, at the same duty ratio (effective applied voltage), to the first structure 30A composed of the sensor incorporated plug 20A and the electricity supply cable 300A connected to the sensor incorporated plug 20A, and to the second structures 30B composed of the plugs 20B and the electricity supply cables 300B connected to the plugs 20B.

Figure 9:
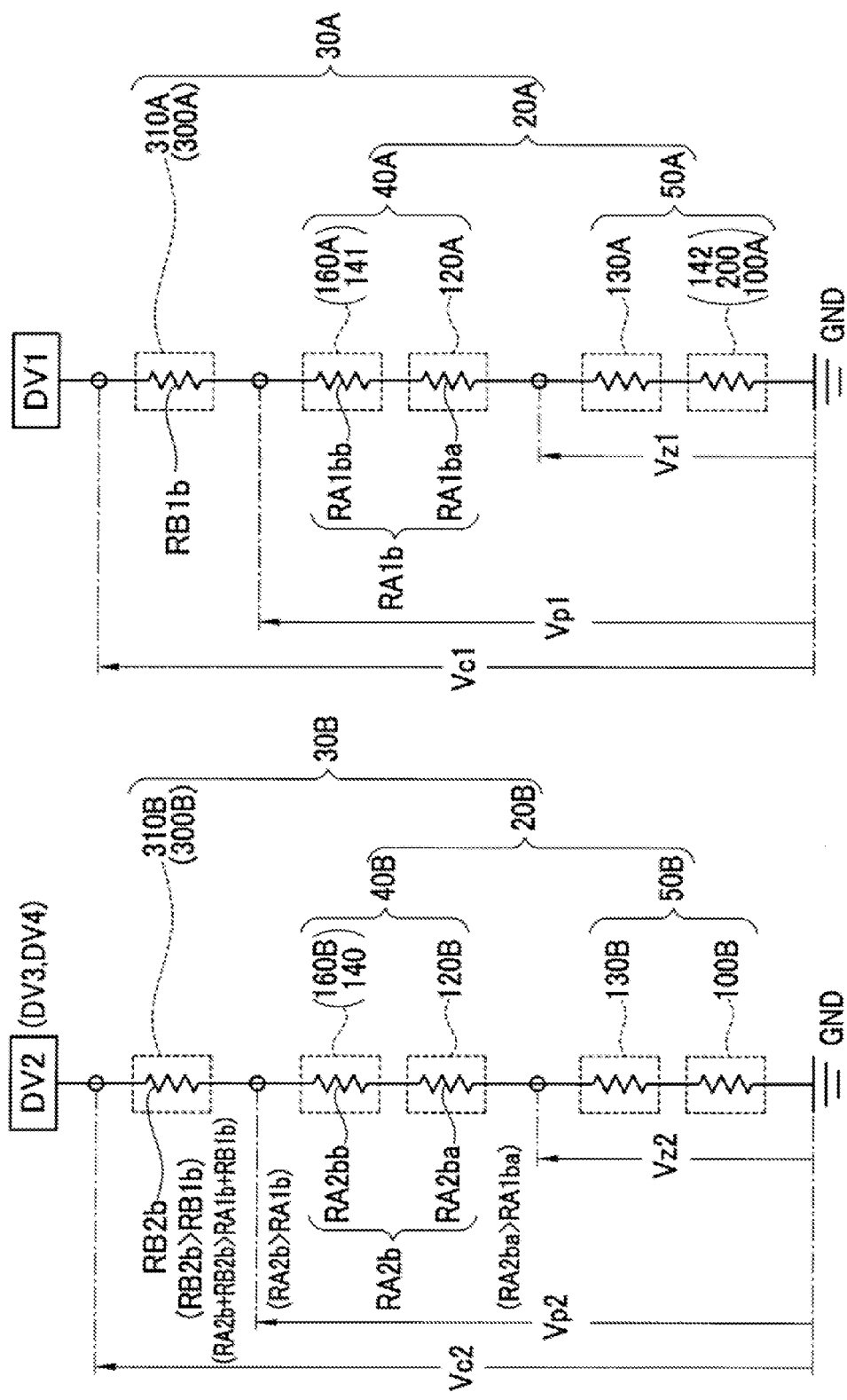
FIG. 9 is an explanatory view for explaining resistances of members of glow plugs and cables and applied voltages in a second embodiment of the present invention.

In the present second embodiment, as shown in FIG. 9, RB1*b* is resistance of the electricity supply line 310A (first electricity supply line) connected to the sensor incorporated plug 20A. RB2*b* is resistance of the electricity supply line 310B (second electricity supply line) connected to the plug 20B.

Also, RA1*b* is resistance of the first electrically conductive member 40A composed of the external connection terminal 160A (first external terminal), the shaft 120A (first shaft), and the first ring member 141 in the sensor incorporated plug 20A. RA2*b* is resistance of the second electrically conductive member 40B composed of the pin terminal 160B (second external terminal), the shaft 120B (second shaft), and the ring member 140 in the plug 20B.

Also, resistance RA1*b* of the first electrically conductive member 40A consists of resistance RA1*ba* of the shaft 120A (first shaft) and total resistance RA1*bb* of the external connection terminal 160A and the first ring member 141. Resistance RA2*b* of the second electrically conductive member 40B consists of resistance RA2*ba* of the shaft 120B (second shaft) and total resistance RA2*bb* of the pin terminal 160B and the ring member 140.

Figure 10:
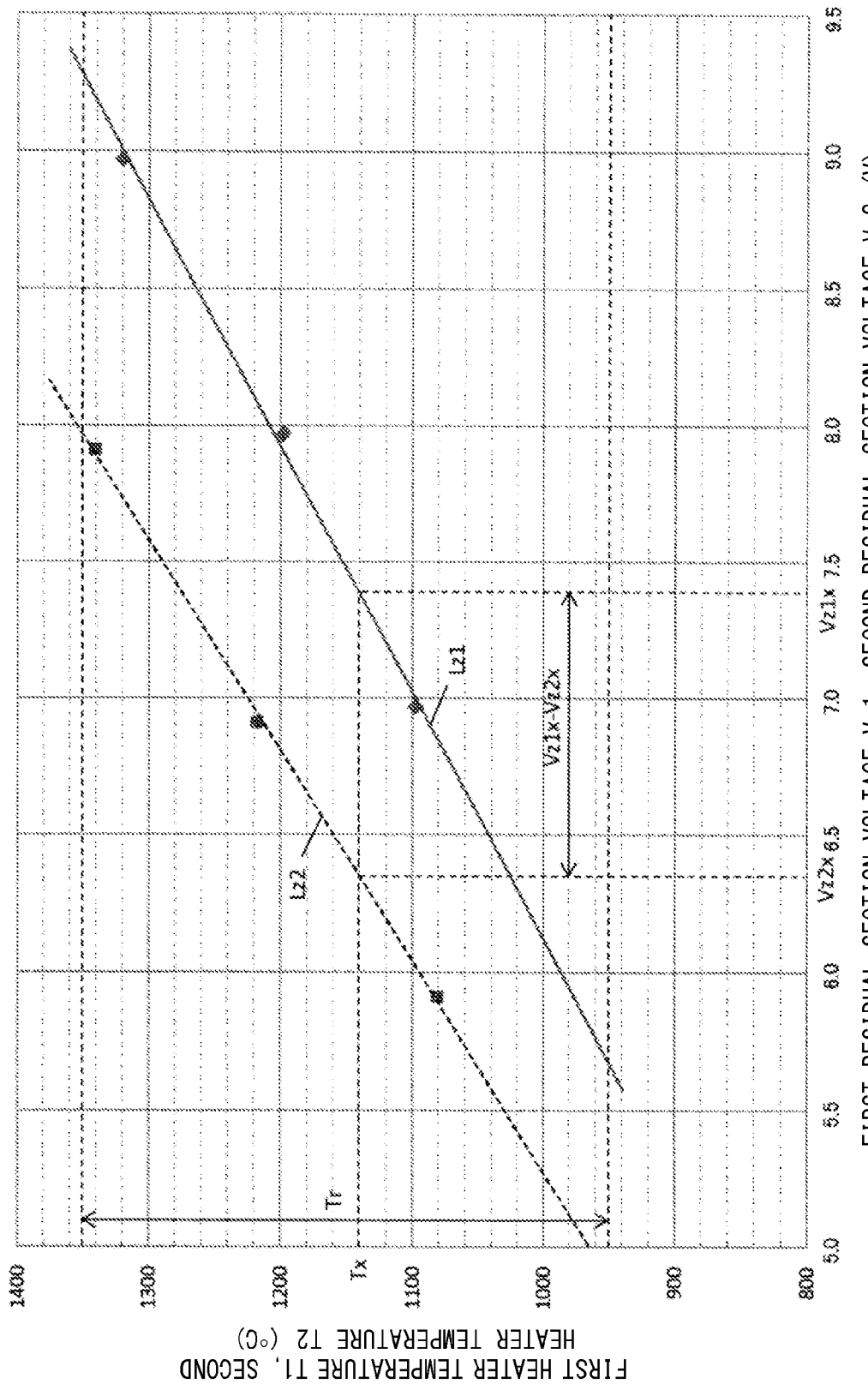
FIG. 10 is a graph showing relations between voltages applied to residual sections remaining after eliminating electrically conductive members from glow plugs and temperatures of heat generated by heaters in the second embodiment.

In the internal combustion engine 1A of the present second embodiment, the sensor incorporated plug 20A and the plug 20B are in such a relation that a first residual section voltage Vz1 (see FIG. 9) vs. first heater temperature T1 characteristic and a second residual section voltage Vz2 (see FIG. 9) vs. second heater temperature T2 characteristic are represented by the graph of FIG. 10, where the first residual section voltage Vz1 is applied to the first residual section 50A, the second residual section voltage Vz2 is applied to the second residual section 50B, the first heater temperature T1 is the temperature of heat generated by the heater 130A, and the second heater temperature T2 is the temperature of heat generated by the heater 130B. The first residual section voltage Vz1 and the second residual section voltage Vz2 in FIG. 10 are measured by the following method: the housing 100A (100B) is drilled for experimental use, and electrical potential of the first ring member 141 (ring member 140) with respect to the reference potential GND is measured through the drilled hole. The first heater temperature T1 and the second heater temperature T2 are measured by measuring the temperatures of the heaters 130A and 130B by use of a radiation thermometer.

A first residual section regression line Lz1 represented by the solid line in FIG. 10 is drawn from a first residual section voltage vs. temperature characteristic indicative of the relation, within a temperature range Tr of 950° C. to 1,350° C., between the first residual section voltage Vz1 and the first heater temperature T1 indicative of the temperature of heat generated by the heater 130A (first heater). Also, a second residual section regression line Lz2 represented by the broken line in FIG. 10 is drawn from a second residual section voltage vs. temperature characteristic indicative of the relation, within the temperature range Tr, between the second residual section voltage Vz2 and the second heater temperature T2 indicative of the temperature of heat generated by the heater 130B (second heater).

Furthermore, as shown in FIG. 10, a first voltage Vz1*x* is the first residual section voltage Vz1 which corresponds, on the first residual section regression line Lz1, to the predetermined temperature Tx of the first heater temperature T1 within the temperature range Tr. Also, a second voltage Vz2*x* is the second residual section voltage Vz2 which corresponds, on the second residual section regression line Lz2, to the same predetermined temperature Tx of the second heater temperature T2. A first-second residual section voltage difference (Vz1*x*−Vz2*x*) is the difference at the predetermined temperature Tx between the first voltage Vz1*x* and the second voltage Vz2*x*. Then, the first residual section regression line Lz1 and the second residual section regression line Lz2 are in such a relation that, at any predetermined temperature Tx within the temperature range Tr, the second voltage Vz2*x* is lower than the first voltage Vz1*x* (Vz2*x*<Vz1*x*).

That is, as represented by the first residual section regression line Lz1 and the second residual section regression line Lz2 in FIG. 10, the sensor incorporated plug 20A and the plug 20B do not match in a heater energization characteristic; specifically, in comparison of the first residual section 50A and the second residual section 50B, an energization characteristic of the heater 130A (first heater) (the relation between the first residual section voltage Vz1 and the first heater temperature T1) with respect to the first residual section 50A and an energization characteristic of the heater 130B (second heater) (the relation between the second residual section voltage Vz2 and the second heater temperature T2) with respect to the second residual section 50B do not match. Also, in the case where the first heater temperature T1 and the second heater temperature T2 are to have the same temperature, a required second residual section voltage Vz2 is lower than a required first residual section voltage Vz1. In other words, in the case where the first residual section voltage Vz1 and the second residual section voltage Vz2 have the same voltage, the second heater temperature T2 becomes higher than the first heater temperature T1.

Thus, when the drive circuits DV1 to DV4 (see FIG. 5) apply electricity to the sensor incorporated plug 20A and the plugs 20B at the same duty ratio (effective voltage), because of difference in energization characteristic between the heater 130A (first heater) of the sensor incorporated plug 20A and the heater 130B (second heater) of the plug 20B, the first heater temperature T1 and the second heater temperature T2 differ from each other (T2>T1); as a result, the cylinders are apt to differ in a glow plug action of assisting in start-up.

Thus, as shown in FIG. 9, in the internal combustion engine 1A of the present second embodiment, the sum (=RA2*b*+RB2*b*) of resistance RA2*b* of the second electrically conductive member 40B and resistance RB2*b* of the electricity supply line 310B (second electricity supply line) is rendered greater than the sum (=RA1*b*+RB1*b*) of resistance RA1*b* of the first electrically conductive member 40A and resistance RB1*b* of the electricity supply line 310A (first electricity supply line) (RA2*b*+RB2*b*>RA1*b*+RB1*b*). Specifically, not only is resistance RB2*b* of the electricity supply line 310B (second electricity supply line) rendered greater than resistance RB1*b* of the electricity supply line 310A (first electricity supply line) (RB2*b*>RB1*b*), but also resistance RA2*ba* of the shaft 120B (second shaft) is rendered greater than resistance RA1*ba* of the shaft 120A (first shaft) (RA2*ba*>RA1*ba*). That is, resistance RA2*b* of the second electrically conductive member 40B is rendered greater than resistance RA1*b* of the first electrically conductive member 40A (RA2*b*>RA1*b*).

More specifically, the electricity supply line 310A (first electricity supply line) is formed of copper wire, whereas, similar to the case of the first embodiment, the electricity supply line 310B (second electricity supply line) is formed of nickel wire, which is higher in specific resistance (electric resistivity) than copper wire. Furthermore, the electricity supply line 310B (second electricity supply line) is smaller in cross-sectional area and longer in overall length than the electricity supply line 310A (first electricity supply line).

Also, in contrast to the first embodiment in which the shaft 120A (first shaft) and the shaft 120B (second shaft) are formed of carbon steel, in the present second embodiment, the shaft 120A (first shaft) is formed of carbon steel, whereas the shaft 120B (second shaft) is formed of stainless steel, which is higher in specific resistance (electric resistivity) than carbon steel.

Figure 11:
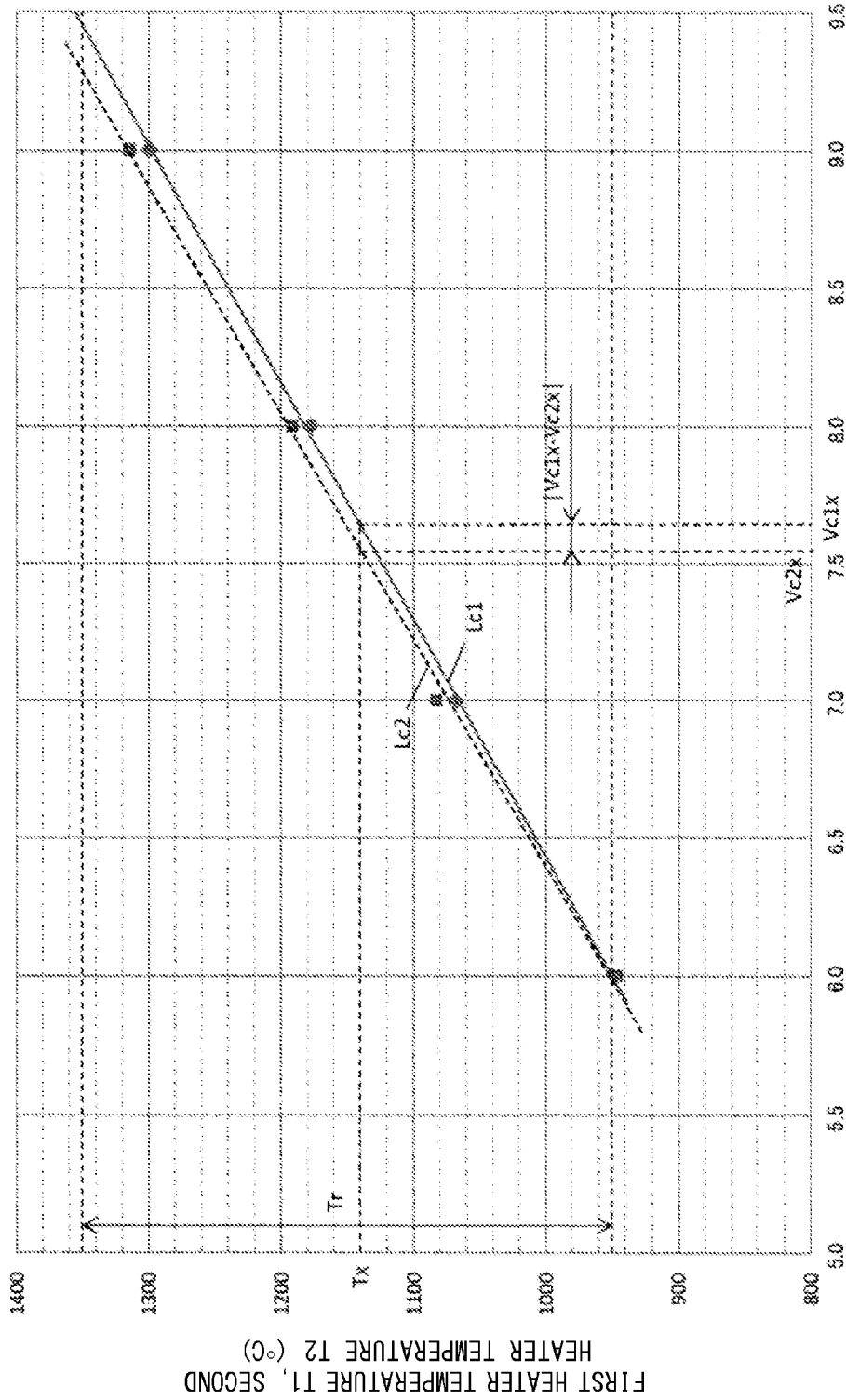
FIG. 11 is a graph showing relations between voltages applied to structures each consisting of a glow plug and an electricity supply cable and temperatures of heat generated by heaters in the second embodiment.

Thus, in the internal combustion engine 1A of the present second embodiment, the first structure 30A (first section) and the second structure 30B (second section) are in such a relation that the first section voltage Vc1 (see FIG. 9) vs. first heater temperature T1 characteristic and a second section voltage Vc2 (see FIG. 9) vs. second heater temperature T2 characteristic are represented by the graph of FIG. 11, where the first section voltage Vc1 is applied to the first structure 30A, and the second section voltage Vc2 is applied to the second structure 30B.

The first section regression line Lc1 represented by the solid line in FIG. 11 is drawn from a first section voltage vs. temperature characteristic indicative of the relation, within a temperature range Tr of 950° C. to 1,350° C., between the first section voltage Vc1 applied to the first structure 30A (first section) and the first heater temperature T1 indicative of the temperature of heat generated by the heater 130A (first heater). Also, the second section regression line Lc2 represented by the broken line in FIG. 11 is drawn from a second section voltage vs. temperature characteristic indicative of the relation, within the temperature range Tr, between the second section voltage Vc2 applied to the second structure 30B (second section) and the second heater temperature T2 indicative of the temperature of heat generated by the heater 130B (second heater).

Furthermore, as shown in FIG. 11, the third voltage Vc1x is the first section voltage Vc1 which corresponds, on the first section regression line Lc1, to the predetermined temperature Tx of the first heater temperature T1 within the temperature range Tr. Also, the fourth voltage Vc2x is the second section voltage Vc2 which corresponds, on the second section regression line Lc2, to the same predetermined temperature Tx of the second heater temperature T2. The overall voltage deviation |Vc1x−Vc2x| is an absolute value of the difference at the predetermined temperature Tx between the third voltage Vc1x and the fourth voltage Vc2x.

Then, the first section regression line Lc1 and the second section regression line Lc2 are in such a relation that, at any predetermined temperature Tx within the temperature range Tr, the overall voltage deviation |Vc1x−Vc2x| is smaller than the first-second residual section voltage difference (Vz1x−Vz2x) in FIG. 10.

That is, deviation between the first section voltage Vc1 and the second section voltage Vc2 (absolute value of the difference between the two voltages) required for the first heater temperature T1 and the second heater temperature T2 to have the same temperature is smaller than the difference between the first residual section voltage Vz1 and the second residual section voltage Vz2.

As mentioned above, in the internal combustion engine 1A of the present second embodiment, the sum (=RA2b+RB2b) of resistance RA2b of the second electrically conductive member 40B and resistance RB2b of the electricity supply line 310B (second electricity supply line) is rendered greater than the sum (=RA1b+RB1b) of resistance RA1b of the first electrically conductive member 40A and resistance RB1b of the electricity supply line 310A (first electricity supply line). By virtue of this, as compared with the relation between energization characteristics of the heaters 130A and the 130B with respect to the first residual section 50A and the second residual section 50B, an energization characteristic (the relation between the first section voltage Vc1 and the first heater temperature T1) of the first structure 30A (first section) composed of the sensor incorporated plug 20A and the electricity supply cable 300A (first electricity supply cable) and an energization characteristic (the relation between the second section voltage Vc2 and the second heater temperature T2) of the second structure 30B (second section) composed of the plug 20B and the electricity supply cable 300B (second electricity supply cable) are closer to each other.

Thus, there can be yielded the internal combustion engine 1A in which, upon application of the same effective voltage from the drive circuits DV1 to DV4 to overall structures consisting of the electricity supply cables 300A and 300B and the glow plugs 20A and 20B, the difference in heater temperature among cylinders is restrained.

Additionally, in the internal combustion engine 1A of the present second embodiment, by means of not only rendering resistance RB2b of the electricity supply line 310B (second electricity supply line) greater than resistance RB1b of the electricity supply line 310A (first electricity supply line), but also rendering resistance RA2b of the second electrically conductive member 40B greater than resistance RA1b of the first electrically conductive member 40A, energization characteristics of the heaters 130A and 130B with respect to overall structures composed of the cables 300A and 300B and the glow plugs 20A and 20B can be brought close to each other.

Specifically, in the internal combustion engine 1A of the present second embodiment, not only is resistance RB2b of the electricity supply line 310B (second electricity supply line) rendered greater than resistance RB1b of the electricity supply line 310A (first electricity supply line), but also resistance RA2ba of the shaft 120B (second shaft) is rendered greater than resistance RA1ba of the shaft 120A (first shaft).

Since the shaft 120A and the shaft 120B are major portions of the first electrically conductive member 40A and the second electrically conductive member 40B, respectively, and have a certain length and a certain diameter, differentiating resistances RA1ba and RA2ba of the first and second shafts 120A and 120B, respectively, is relatively easy.

Thus, if rendering resistance RB2b of the electricity supply line 310B (second electricity supply line) greater than resistance RB1b of the electricity supply line 310A (first electricity supply line) is not sufficient to bring, close to each other, energization characteristics of the heaters 130A and 130B with respect to overall structures composed of the cables 300A and 300B and the glow plugs 20A and 20B, the energization characteristics can be brought closer to each other by means of additionally rendering resistance RA2ba of the shaft 120B (second shaft) greater than resistance RA1ba of the shaft 120A (first shaft).

In the internal combustion engine 1A of the present second embodiment, not only is resistance RB2b of the electricity supply line 310B (second electricity supply line) rendered greater than resistance RB1b of the electricity supply line 310A (first electricity supply line), but also resistance RA2ba of the shaft 120B (second shaft) is rendered greater than resistance RA1ba of the shaft 120A (first shaft).

However, a method of rendering the sum (=RA2b+RB2b) of resistance RA2b of the second electrically conductive member 40B and resistance RB2b of the electricity supply line 310B (second electricity supply line) greater than the sum (=RA1b+RB1b) of resistance RA1b of the first electrically conductive member 40A and resistance RB1b of the electricity supply line 310A (first electricity supply line) is not limited thereto. Specifically, in addition to the method mentioned above, there are a method of rendering resistance RA2ba of the shaft 120B (second shaft) greater than resistance RA1ba of the shaft 120A (first shaft) (RA2ba>RA1ba) and a method of rendering resistance RB2b of the electricity supply line 310B (second electricity supply line) greater than resistance RB1b of the electricity supply line 310A (first electricity supply line) (RB2b>RB1b).

Thus, by means of rendering resistance RB2b of the electricity supply line 310B (second electricity supply line) greater than resistance RB1b of the electricity supply line 310A (first electricity supply line), or, in place of or in addition to this, rendering resistance RA2ba of the shaft 120B (second shaft) greater than resistance RA1ba of the shaft 120A (first shaft), energization characteristics of the heaters 130A and 130B with respect to overall structures composed of the cables 300A and 300B and the glow plugs 20A and 20B can be brought close to each other.

In the case of employment of only the method of rendering resistance RB2b of the electricity supply line 310B (second electricity supply line) greater than resistance RB1b of the electricity supply line 310A (first electricity supply line), the configuration of the present second embodiment becomes similar to that of the first embodiment shown in FIG. 6.

C. Third Embodiment

A third embodiment of the present invention will next be described with reference to the drawings. As shown in FIGS. 1 and 5, similar to the internal combustion engines 1 and 1A of the first and second embodiments, respectively, described above, in an internal combustion engine 1B according to the third embodiment, of the four cylinders 11A to 11D of the engine body 10, the cylinder 11A has the sensor incorporated plug 20A mounted thereto, and the remaining three cylinders 11B to 11D each have the plug 20B mounted thereto and having no pressure sensor. The sensor incorporated plug 20A and the plugs 20B are connected to the four drive circuits DV1 to DV4, respectively, of the GCU through the electricity supply cables 300A and 300B encompassing the electricity supply lines 310A and 310B.

Similar to the first and second embodiments, the drive circuits DV1 to DV4 supply electricity, at the same duty ratio (effective applied voltage), to the first structure 30A composed of the sensor incorporated plug 20A and the electricity supply cable 300A connected to the sensor incorporated plug 20A, and to the second structures 30B composed of the plugs 20B and the electricity supply cables 300B connected to the plugs 20B.

Figure 12:
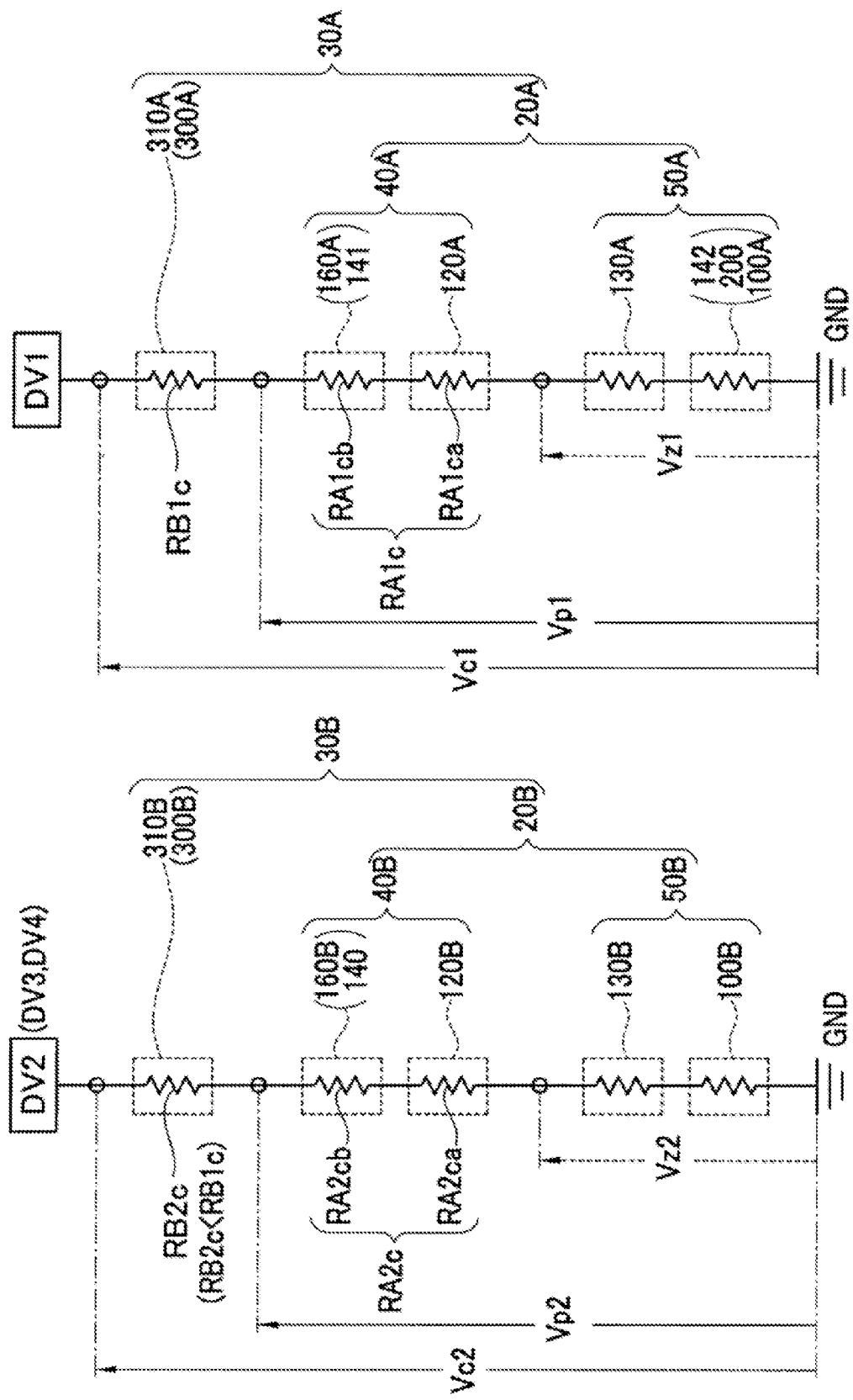
FIG. 12 is an explanatory view for explaining resistances of members of glow plugs and cables and applied voltages in a third embodiment of the present invention.

In the present third embodiment, as shown in FIG. 12, RB1c is resistance of the electricity supply line 310A (first electricity supply line) connected to the sensor incorporated plug 20A. RB2c is resistance of the electricity supply line 310B (second electricity supply line) connected to the plug 20B.

Also, RA1c is resistance of the first electrically conductive member 40A composed of the external connection terminal 160A (first external terminal), the shaft 120A (first shaft), and the first ring member 141 in the sensor incorporated plug 20A. RA2c is resistance of the second electrically conductive member 40B composed of the pin terminal 160B (second external terminal), the shaft 120B (second shaft), and the ring member 140 in the plug 20B.

Also, resistance RA1c of the first electrically conductive member 40A consists of resistance RA1ca of the shaft 120A (first shaft) and total resistance RA1cb of the external connection terminal 160A and the first ring member 141. Resistance RA2c of the second electrically conductive member 40B consists of resistance RA2ca of the shaft 120B (second shaft) and total resistance RA2cb of the pin terminal 160B and the ring member 140.

Figure 13:
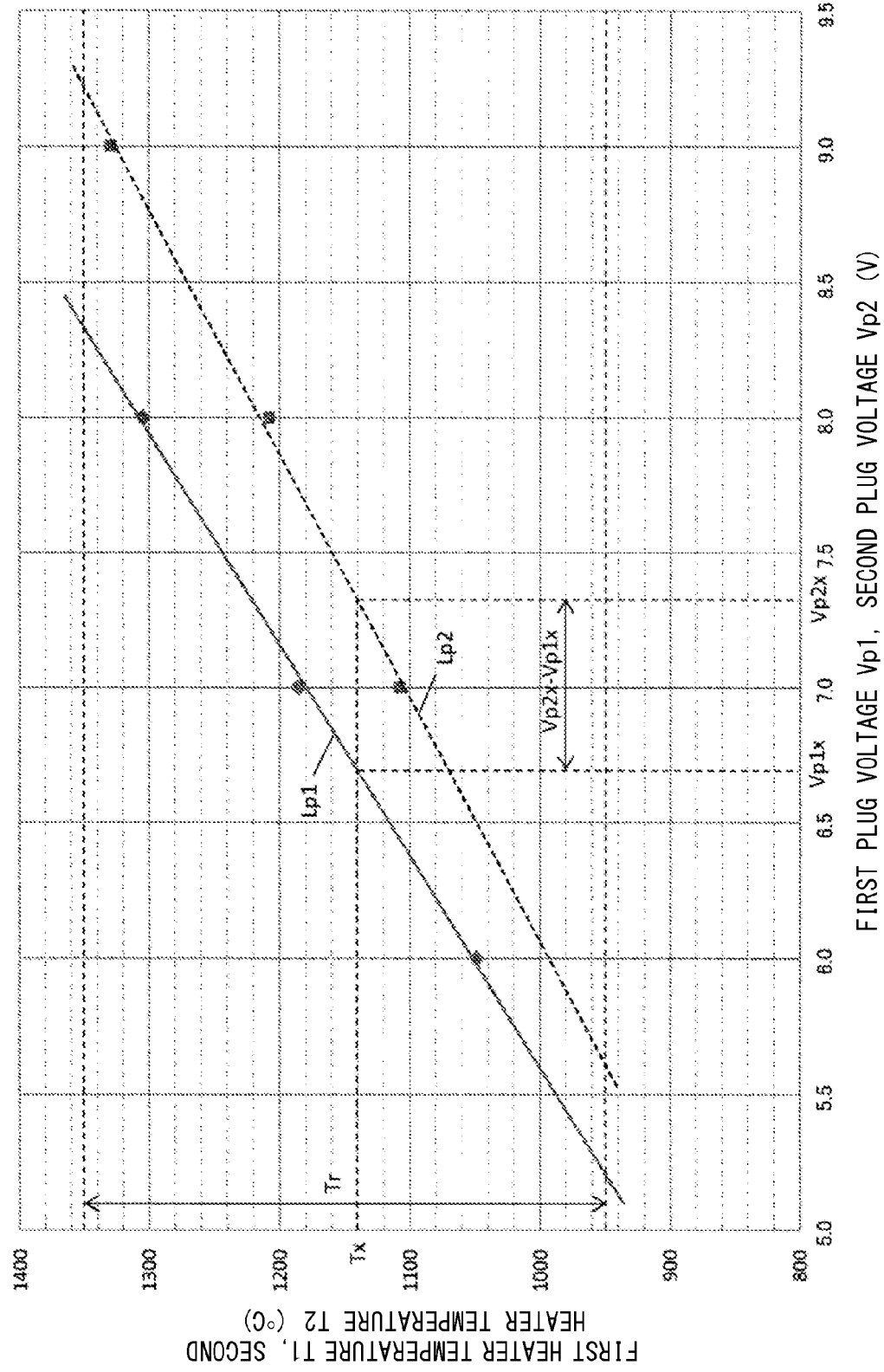
FIG. 13 is a graph showing relations between voltages applied to glow plugs and temperatures of heat generated by heaters in the third embodiment.

In the internal combustion engine 1B of the present third embodiment, the sensor incorporated plug 20A and the plug 20B are in such a relation that a first plug voltage Vp1 (see FIG. 12) vs. first heater temperature T1 characteristic and a second plug voltage Vp2 (see FIG. 12) vs. second heater temperature T2 characteristic are represented by the graph of FIG. 13, where the first plug voltage Vp1 is applied to the sensor incorporated plug 20A, the second plug voltage Vp2 is applied to the plug 20B, the first heater temperature T1 is the temperature of heat generated by the heater 130A, and the second heater temperature T2 is the temperature of heat generated by the heater 130B.

The first plug regression line Lp1 represented by the solid line in FIG. 13 is drawn from a first plug voltage vs. temperature characteristic indicative of the relation, within a temperature range Tr of 950° C. to 1,350° C., between the first plug voltage Vp1 applied to the sensor incorporated plug 20A and the first heater temperature T1 indicative of the temperature of heat generated by the heater 130A (first heater). Also, the second plug regression line Lp2 represented by the broken line in FIG. 13 is drawn from a second plug voltage vs. temperature characteristic indicative of the relation, within the temperature range Tr, between the second plug voltage Vp2 applied to the plug 20B and the second heater temperature T2 indicative of the temperature of heat generated by the heater 130B (second heater).

Furthermore, as shown in FIG. 13, the first voltage Vp1x is the first plug voltage Vp1 which corresponds, on the first plug regression line Lp1, to the predetermined temperature Tx of the first heater temperature T1 within the temperature range Tr. Also, the second voltage Vp2x is the second plug voltage Vp2 which corresponds, on the second plug regression line Lp2, to the same predetermined temperature Tx of the second heater temperature T2. A second-first plug voltage difference (Vp2x−Vp1x) is the difference at the predetermined temperature Tx between the second voltage Vp2x and the first voltage Vp1x. Then, the first plug regression line Lp1 and the second plug regression line Lp2 are in such a relation that, at any predetermined temperature Tx within the temperature range Tr, the second voltage Vp2x is higher than the first voltage Vp1x (Vp2x>Vp1x).

That is, as represented by the first plug regression line Lp1 and the second plug regression line Lp2 in FIG. 13, the sensor incorporated plug 20A and the plug 20B do not match in a heater energization characteristic indicative of the relation between voltages (first plug voltage Vp1 and second plug voltage Vp2) applied to the plugs and temperatures of heat generated by the heaters (first heater temperature T1 and second heater temperature T2). Also, in the case where the first heater temperature T1 and the second heater temperature T2 are to have the same temperature, a required second plug voltage Vp2 is higher than a required first plug voltage Vp1. In other words, in the case where the first plug voltage Vp1 and the second plug voltage Vp2 applied to the respective glow plugs have the same voltage, the second heater temperature T2 becomes lower than the first heater temperature T1.

Thus, when the drive circuits DV1 to DV4 (see FIG. 5) apply electricity to the sensor incorporated plug 20A and the plugs 20B at the same duty ratio (effective voltage), because of difference in energization characteristic between the heater 130A (first heater) of the sensor incorporated plug 20A and the heater 130B (second heater) of the plug 20B, the first heater temperature T1 and the second heater temperature T2 differ from each other (T2<T1); as a result, the cylinders are apt to differ in a glow plug action of assisting in start-up.

Thus, as shown in FIG. 12, in the internal combustion engine 1B of the present third embodiment, resistance RB2c of the electricity supply line 310B (second electricity supply line) connected to the plug 20B is rendered smaller than resistance RB1c of the electricity supply line 310A (first electricity supply line) connected to the sensor incorporated plug 20A (RB2c<RB1c).

Specifically, the electricity supply line 310B (second electricity supply line) is formed of copper wire, whereas the electricity supply line 310A (first electricity supply line) is formed of nickel wire, which is higher in specific resistance (electric resistivity) than copper wire. Furthermore, the electricity supply line 310A (first electricity supply line) is smaller in cross-sectional area and longer in overall length than the electricity supply line 310B (second electricity supply line).

In the present third embodiment, the shaft 120A (first shaft) and the shaft 120B (second shaft) are formed of carbon steel. Also, in contrast to the fourth embodiment, which will be described later, resistance RA1ca of the shaft 120A and resistance RA2ca of the shaft 120B are substantially equal to each other, and resistance RA1c of the first electrically conductive member 40A and resistance RA2c of the second electrically conductive member 40B are substantially equal to each other.

Figure 14:
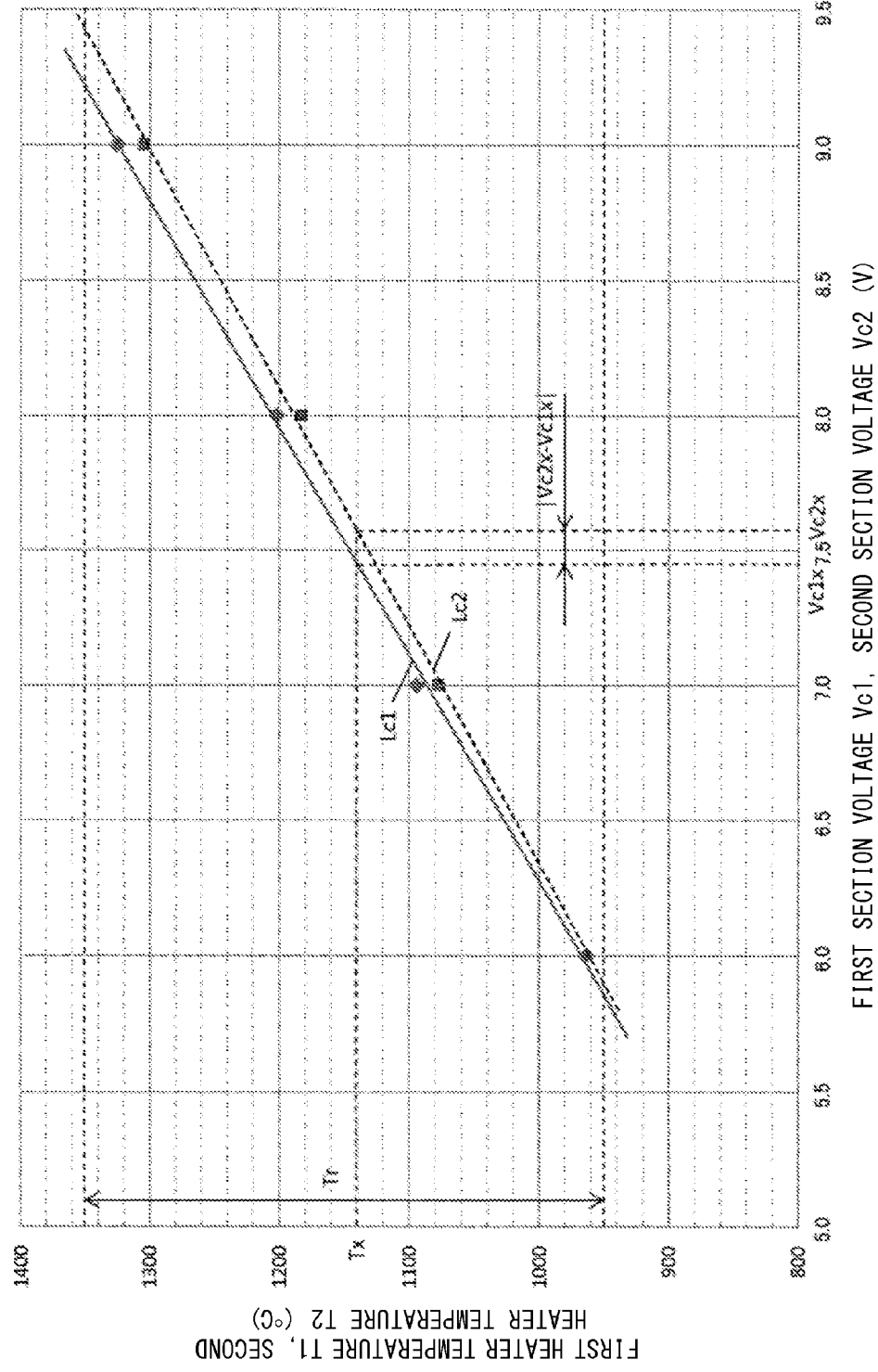
FIG. 14 is a graph showing relations between voltages applied to structures each consisting of a glow plug and an electricity supply cable and temperatures of heat generated by heaters in the third embodiment.

Thus, in the internal combustion engine 1B of the present third embodiment, the first structure 30A (first section) and the second structure 30B (second section) are in such a relation that a first section voltage Vc1 (see FIG. 12) vs. first heater temperature T1 characteristic and a second section voltage Vc2 (see FIG. 12) vs. second heater temperature T2 characteristic are represented by the graph of FIG. 14, where the first section voltage Vc1 is applied to the first structure 30A, and the second section voltage Vc2 is applied to the second structure 30B.

The first section regression line Lc1 represented by the solid line in FIG. 14 is drawn from a first section voltage vs. temperature characteristic indicative of the relation, within a temperature range Tr of 950° C. to 1,350° C., between the first section voltage Vc1 applied to the first structure 30A (first section) and the first heater temperature T1 indicative of the temperature of heat generated by the heater 130A (first heater). Also, the second section regression line Lc2 represented by the broken line in FIG. 14 is drawn from a second section voltage vs. temperature characteristic indicative of the relation, within the temperature range Tr, between the second section voltage Vc2 applied to the second structure 30B (second section) and the second heater temperature T2 indicative of the temperature of heat generated by the heater 130B (second heater).

Furthermore, as shown in FIG. 14, the third voltage Vc1x is the first section voltage Vc1 which corresponds, on the first section regression line Lc1, to the predetermined temperature Tx of the first heater temperature T1 within the temperature range Tr. Also, the fourth voltage Vc2x is the second section voltage Vc2 which corresponds, on the second section regression line Lc2, to the same predetermined temperature Tx of the second heater temperature T2. An overall voltage deviation |Vc2x−Vc1x| is an absolute value of the difference at the predetermined temperature Tx between the fourth voltage Vc2x and the third voltage Vc1x.

Then, the first section regression line Lc1 and the second section regression line Lc2 are in such a relation that, at any predetermined temperature Tx within the temperature range Tr, the overall voltage deviation |Vc2x−Vc1x| is smaller than the second-first plug voltage difference (Vp2x−Vp1x) in FIG. 13.

That is, deviation between the second section voltage Vc2 and the first section voltage Vc1 (absolute value of the difference between the two voltages) required for the first heater temperature T1 and the second heater temperature T2 to have the same temperature is smaller than the difference between the second plug voltage Vp2 and the first plug voltage Vp1.

As mentioned above, in the internal combustion engine 1B of the present third embodiment, resistance RB2c of the electricity supply line 310B (second electricity supply line) is rendered smaller than resistance RB1c of the electricity supply line 310A (first electricity supply line). By virtue of this, as compared with the relation between energization characteristics of the heaters 130A and the 130B with respect to the glow plugs 20A and 20B, an energization characteristic (the relation between the first section voltage Vc1 and the first heater temperature T1) of the first structure 30A (first section) composed of the sensor incorporated plug 20A and the electricity supply cable 300A (first electricity supply cable) and an energization characteristic (the relation between the second section voltage Vc2 and the second heater temperature T2) of the second structure 30B (second section) composed of the plug 20B and the electricity supply cable 300B (second electricity supply cable) are closer to each other.

Thus, there can be yielded the internal combustion engine 1B in which, upon application of the same effective voltage from the drive circuits DV1 to DV4 to overall structures consisting of the electricity supply cables 300A and 300B and the glow plugs 20A and 20B, the difference in heater temperature among cylinders is restrained.

D. Fourth Embodiment

A fourth embodiment of the present invention will next be described with reference to the drawings. As shown in FIGS. 1 and 5, similar to the internal combustion engines 1, 1A, and 1B of the first to third embodiments described above, in an internal combustion engine 1C according to the fourth embodiment, of the four cylinders 11A to 11D of the engine body 10, the cylinder 11A has the sensor incorporated plug 20A mounted thereto, and the remaining three cylinders 11B to 11D each have the plug 20B mounted thereto and having no pressure sensor. The sensor incorporated plug 20A and the plugs 20B are connected to the four drive circuits DV1 to DV4, respectively, of the GCU through the electricity supply cables 300A and 300B encompassing the electricity supply lines 310A and 310B.

Similar to the first to third embodiments, the drive circuits DV1 to DV4 supply electricity, at the same duty ratio (effective applied voltage), to the first structure 30A composed of the sensor incorporated plug 20A and the electricity supply cable 300A connected to the sensor incorporated plug 20A, and to the second structures 30B composed of the plugs 20B and the electricity supply cables 300B connected to the plugs 20B.

Figure 15:
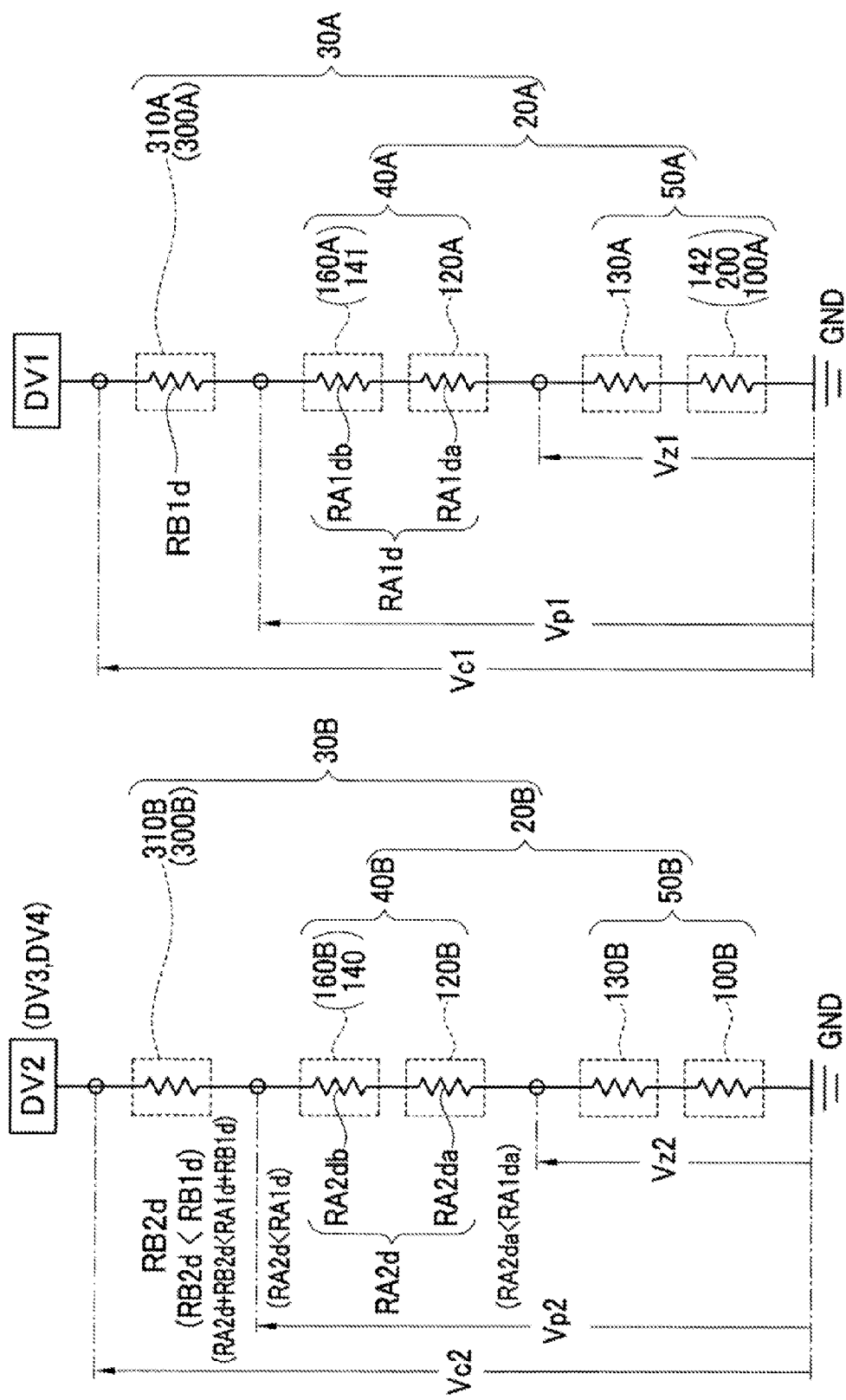
FIG. 15 is an explanatory view for explaining resistances of members of glow plugs and cables and applied voltages in a fourth embodiment of the present invention.

In the present fourth embodiment, as shown in FIG. 15, RB1$d$ is resistance of the electricity supply line 310A (first electricity supply line) connected to the sensor incorporated plug 20A. RB2$d$ is resistance of the electricity supply line 310B (second electricity supply line) connected to the plug 20B.

Also, RA1$d$ is resistance of the first electrically conductive member 40A composed of the external connection terminal 160A (first external terminal), the shaft 120A (first shaft), and the first ring member 141 in the sensor incorporated plug 20A. RA2$d$ is resistance of the second electrically conductive member 40B composed of the pin terminal 160B (second external terminal), the shaft 120B (second shaft), and the ring member 140 in the plug 20B.

Also, resistance RA1$d$ of the first electrically conductive member 40A consists of resistance RA1$da$ of the shaft 120A (first shaft) and total resistance RA1$db$ of the external connection terminal 160A and the first ring member 141. Resistance RA2$d$ of the second electrically conductive member 40B consists of resistance RA2$da$ of the shaft 120B (second shaft) and total resistance RA2$db$ of the pin terminal 160B and the ring member 140.

Figure 16:
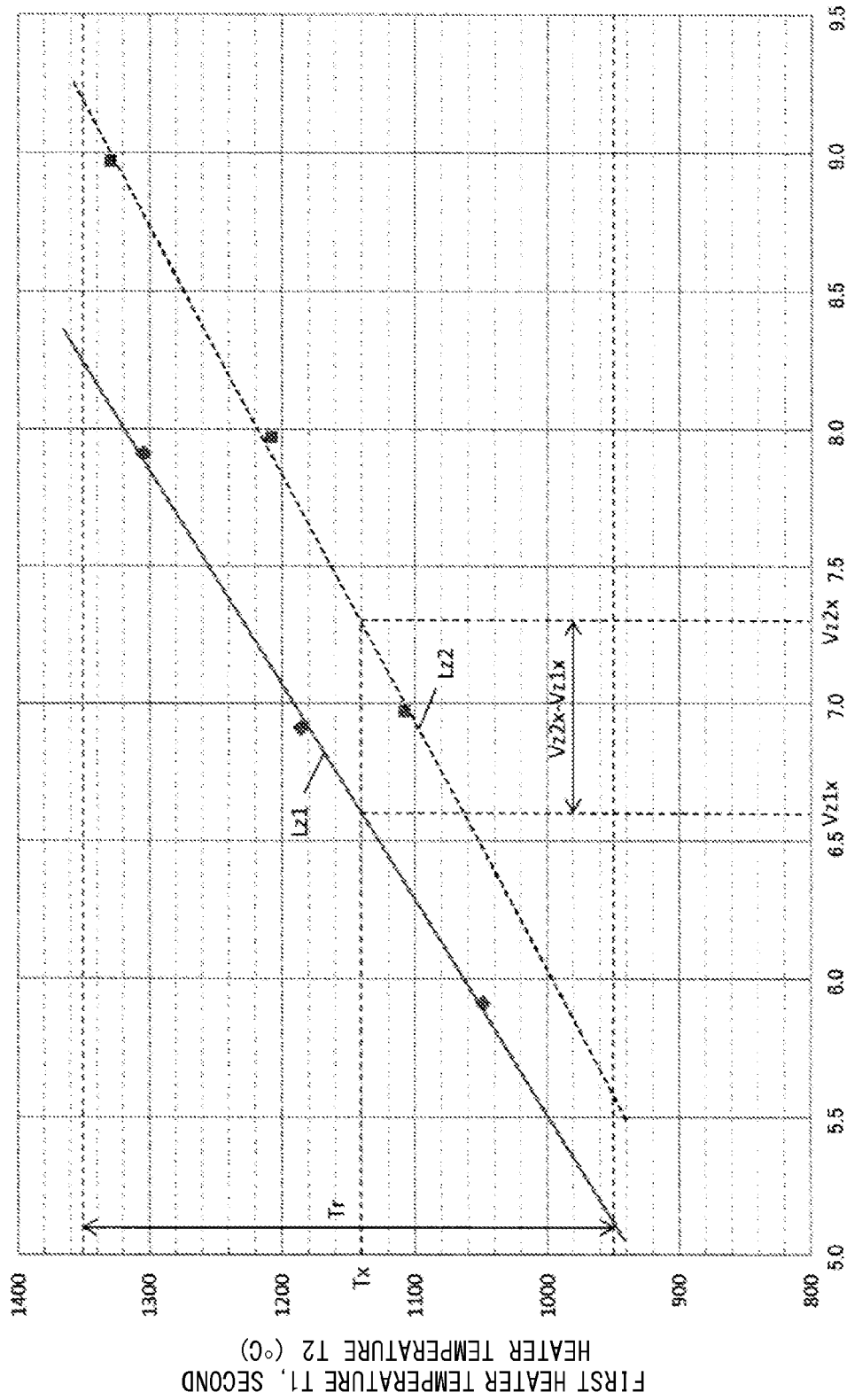
FIG. 16 is a graph showing relations between voltages applied to residual sections remaining after eliminating electrically conductive members from glow plugs and temperatures of heat generated by heaters in the fourth embodiment.

In the internal combustion engine 1C of the present fourth embodiment, the sensor incorporated plug 20A and the plug 20B are in such a relation that a first residual section voltage Vz1 (see FIG. 15) vs. first heater temperature T1 characteristic and a second residual section voltage Vz2 (see FIG. 15) vs. second heater temperature T2 characteristic are represented by the graph of FIG. 16, where the first residual section voltage Vz1 is applied to the first residual section 50A, the second residual section voltage Vz2 is applied to the second residual section 50B, the first heater temperature T1 is the temperature of heat generated by the heater 130A, and the second heater temperature T2 is the temperature of heat generated by the heater 130B. The first residual section voltage Vz1 and the second residual section voltage Vz2 in FIG. 16 are measured by the following method: the housing 100A (100B) is drilled for experimental use, and electrical potential of the first ring member 141 (ring member 140) with respect to the reference potential GND is measured through the drilled hole.

The first residual section regression line Lz1 represented by the solid line in FIG. 16 is drawn from a first residual section voltage vs. temperature characteristic indicative of the relation, within a temperature range Tr of 950° C. to 1,350° C., between the first residual section voltage Vz1 and the first heater temperature T1 indicative of the temperature of heat generated by the heater 130A (first heater). Also, the second residual section regression line Lz2 represented by the broken line in FIG. 16 is drawn from a second residual section voltage vs. temperature characteristic indicative of the relation, within the temperature range Tr, between the second residual section voltage Vz2 and the second heater temperature T2 indicative of the temperature of heat generated by the heater 130B (second heater).

Furthermore, as shown in FIG. 16, the first voltage Vz1$x$ is the first residual section voltage Vz1 which corresponds, on the first residual section regression line Lz1, to the predetermined temperature Tx of the first heater temperature T1 within the temperature range Tr. Also, the second voltage Vz2$x$ is the second residual section voltage Vz2 which corresponds, on the second residual section regression line Lz2, to the same predetermined temperature Tx of the second heater temperature T2. A second-first residual section voltage difference (Vz2$x$−Vz1$x$) is the difference at the predetermined temperature Tx between the second voltage Vz2$x$ and the first voltage Vz1$x$. Then, the first residual section regression line Lz1 and the second residual section regression line Lz2 are in such a relation that, at any predetermined temperature Tx within the temperature range Tr, the second voltage Vz2$x$ is higher than the first voltage Vz1$x$ (Vz2$x$>Vz1$x$).

That is, as represented by the first residual section regression line Lz1 and the second residual section regression line Lz2 in FIG. 16, the sensor incorporated plug 20A and the plug 20B do not match in a heater energization characteristic; specifically, in comparison of the first residual section 50A and the second residual section 50B, an energization characteristic of the heater 130A (first heater) (the relation between the first residual section voltage Vz1 and the first heater temperature T1) with respect to the first residual section 50A and an energization characteristic of the heater 130B (second heater) (the relation between the second residual section voltage Vz2 and the second heater temperature T2) with respect to the second residual section 50B do not match. Also, in the case where the first heater temperature T1 and the second heater temperature T2 are to have the same temperature, a required second residual section voltage Vz2 is higher than a required first residual section voltage Vz1. In other words, in the case where the first residual section voltage Vz1 and the second residual section voltage Vz2 have the same voltage, the second heater temperature T2 becomes lower than the first heater temperature T1.

Thus, when the drive circuits DV1 to DV4 (see FIG. 5) apply electricity to the sensor incorporated plug 20A and the plugs 20B at the same duty ratio (effective voltage), because of difference in energization characteristic between the heater 130A (first heater) of the sensor incorporated plug 20A and the heater 130B (second heater) of the plug 20B, the first heater temperature T1 and the second heater temperature T2 differ from each other (T2<T1); as a result, the cylinders are apt to differ in a glow plug action of assisting in start-up.

Thus, as shown in FIG. 15, in the internal combustion engine 1C of the present fourth embodiment, the sum (=RA2$d$+RB2$d$) of resistance RA2$d$ of the second electrically conductive member 40B and resistance RB2$d$ of the electricity supply line 310B (second electricity supply line) is rendered smaller than the sum (=RA1$d$+RB1$d$) of resistance RA1$d$ of the first electrically conductive member 40A and resistance RB1$d$ of the electricity supply line 310A (first electricity supply line) (RA2$d$+RB2$d$<RA1$d$+RB1$d$). Specifically, not only is resistance RB2$d$ of the electricity supply line 310B (second electricity supply line) rendered smaller than resistance RB1$d$ of the electricity supply line 310A (first electricity supply line) (RB2$d$<RB1$d$), but also resistance RA2$da$ of the shaft 120B (second shaft) is rendered smaller than resistance RA1$da$ of the shaft 120A (first shaft) (RA2$da$<RA1$da$). That is, resistance RA2$d$ of the second electrically conductive member 40B is rendered smaller than resistance RA1$d$ of the first electrically conductive member 40A (RA2$d$<RA1$d$).

More specifically, the electricity supply line 310B (second electricity supply line) is formed of copper wire, whereas, similar to the case of the third embodiment, the electricity supply line 310A (first electricity supply line) is formed of nickel wire, which is higher in specific resistance (electric resistivity) than copper wire. Furthermore, the electricity supply line 310A (first electricity supply line) is smaller in cross-sectional area and longer in overall length than the electricity supply line 310B (second electricity supply line).

Also, in contrast to the third embodiment in which the shaft 120A (first shaft) and the shaft 120B (second shaft) are formed of carbon steel, in the present fourth embodiment, the shaft 120B (second shaft) is formed of carbon steel, whereas the shaft 120A (first shaft) is formed of stainless steel, which is higher in specific resistance (electric resistivity) than carbon steel.

Figure 17:
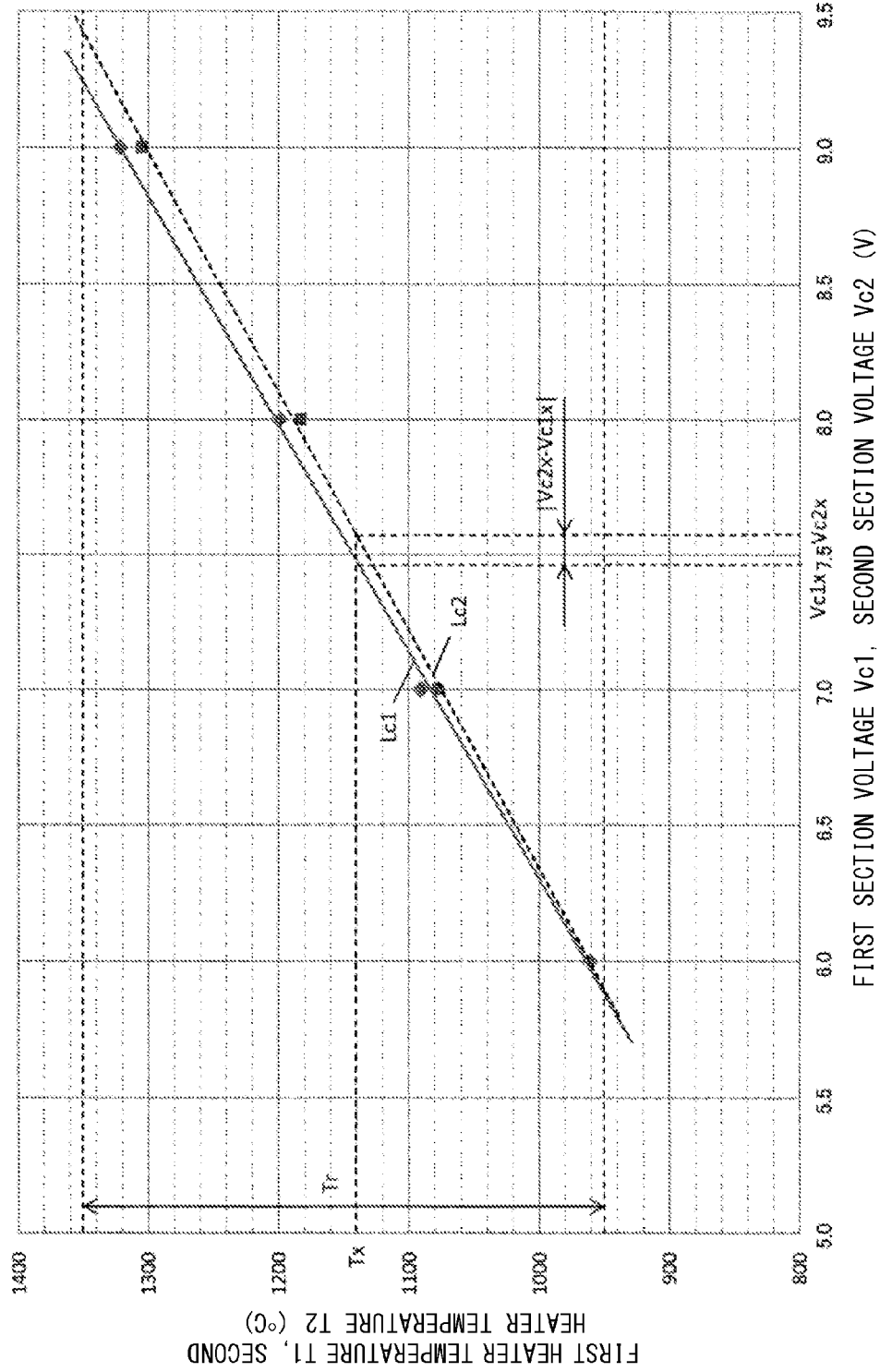
FIG. 17 is a graph showing relations between voltages applied to structures each consisting of a glow plug and an electricity supply cable and temperatures of heat generated by heaters in the fourth embodiment.

Thus, in the internal combustion engine 1C of the present fourth embodiment, the first structure 30A (first section) and the second structure 30B (second section) are in such a relation that the first section voltage Vc1 (see FIG. 15) vs. first heater temperature T1 characteristic and a second section voltage Vc2 (see FIG. 15) vs. second heater temperature T2 characteristic are represented by the graph of FIG. 17, where the first section voltage Vc1 is applied to the first structure 30A, and the second section voltage Vc2 is applied to the second structure 30B.

The first section regression line Lc1 represented by the solid line in FIG. 17 is drawn from a first section voltage vs. temperature characteristic indicative of the relation, within a temperature range Tr of 950° C. to 1,350° C., between the first section voltage Vc1 applied to the first structure 30A (first section) and the first heater temperature T1 indicative of the temperature of heat generated by the heater 130A (first heater). Also, the second section regression line Lc2 represented by the broken line in FIG. 17 is drawn from a second section voltage vs. temperature characteristic indicative of the relation, within the temperature range Tr, between the second section voltage Vc2 applied to the second structure 30B (second section) and the second heater temperature T2 indicative of the temperature of heat generated by the heater 130B (second heater).

Furthermore, as shown in FIG. 17, the third voltage Vc1$x$ is the first section voltage Vc1 which corresponds, on the first section regression line Lc1, to the predetermined temperature Tx of the first heater temperature T1 within the temperature range Tr. Also, the fourth voltage Vc2$x$ is the second section voltage Vc2 which corresponds, on the second section regression line Lc2, to the same predetermined temperature Tx of the second heater temperature T2. The overall voltage deviation |Vc2$x$−Vc1$x$| is an absolute value of the difference at the predetermined temperature Tx between the fourth voltage Vc2$x$ and the third voltage Vc1$x$.

Then, the first section regression line Lc1 and the second section regression line Lc2 are in such a relation that, at any predetermined temperature Tx within the temperature range Tr, the overall voltage deviation |Vc2$x$−Vc1$x$| is smaller than the second-first residual section voltage difference (Vz2$x$−Vz1$x$) in FIG. 16.

That is, deviation between the second section voltage Vc2 and the first section voltage Vc1 (absolute value of the difference between the two voltages) required for the first heater temperature T1 and the second heater temperature T2 to have the same temperature is smaller than the difference between the second residual section voltage Vz2 and the first residual section voltage Vz1.

As mentioned above, in the internal combustion engine 1C of the present fourth embodiment, the sum (=RA2$d$+RB2$d$) of resistance RA2$d$ of the second electrically conductive member 40B and resistance RB2$d$ of the electricity supply line 310B (second electricity supply line) is rendered smaller than the sum (=RA1$d$+RB1$d$) of resistance RA1$d$ of the first electrically conductive member 40A and resistance RB1$d$ of the electricity supply line 310A (first electricity supply line). By virtue of this, as compared with the relation between energization characteristics of the heaters 130A and the 130B with respect to the first residual section 50A and the second residual section 50B, an energization characteristic (the relation between the first section voltage Vc1 and the first heater temperature T1) of the first structure 30A (first section) composed of the sensor incorporated plug 20A and the electricity supply cable 300A (first electricity supply cable) and an energization characteristic (the relation between the second section voltage Vc2 and the second heater temperature T2) of the second structure 30B (second section) composed of the plug 20B and the electricity supply cable 300B (second electricity supply cable) are closer to each other.

Thus, there can be yielded the internal combustion engine 1C in which, upon application of the same effective voltage from the drive circuits DV1 to DV4 to overall structures consisting of the electricity supply cables 300A and 300B and the glow plugs 20A and 20B, the difference in heater temperature among cylinders is restrained.

Additionally, in the internal combustion engine 1C of the present fourth embodiment, by means of not only rendering resistance RB2$d$ of the electricity supply line 310B (second electricity supply line) smaller than resistance RB1$d$ of the electricity supply line 310A (first electricity supply line), but also rendering resistance RA2$d$ of the second electrically conductive member 40B smaller than resistance RA1$d$ of the first electrically conductive member 40A, energization characteristics of the heaters 130A and 130B with respect to overall structures composed of the cables 300A and 300B and the glow plugs 20A and 20B can be brought close to each other.

Specifically, in the internal combustion engine 1C of the present fourth embodiment, not only is resistance RB2$d$ of the electricity supply line 310B (second electricity supply line) rendered smaller than resistance RB1$d$ of the electricity supply line 310A (first electricity supply line), but also resistance RA2$da$ of the shaft 120B (second shaft) is rendered smaller than resistance RA1$da$ of the shaft 120A (first shaft).

Since the shaft 120A and the shaft 120B are major portions of the first electrically conductive member 40A and the second electrically conductive member 40B, respectively, and have a certain length and a certain diameter, differentiating resistances RA1$da$ and RA2$da$ of the first and second shafts 120A and 120B, respectively, is relatively easy. Thus, if rendering resistance RB2$d$ of the electricity supply line 310B (second electricity supply line) smaller than resistance RB1$d$ of the electricity supply line 310A (first electricity supply line) is not sufficient to bring, close to each other, energization characteristics of the heaters 130A and 130B with respect to overall structures composed of the cables 300A and 300B and the glow plugs 20A and 20B, the energization characteristics can be brought closer to each other by means of additionally rendering resistance RA2$da$ of the shaft 120B (second shaft) smaller than resistance RA1$da$ of the shaft 120A (first shaft).

In the internal combustion engine 1C of the present fourth embodiment, not only resistance RB2$d$ of the electricity supply line 310B (second electricity supply line) is rendered smaller than resistance RB1$d$ of the electricity supply line 310A (first electricity supply line), but also resistance RA2$da$ of the shaft 120B (second shaft) is rendered smaller than resistance RA1$da$ of the shaft 120A (first shaft).

However, a method of rendering the sum (=RA2$d$+RB2$d$) of resistance RA2$d$ of the second electrically conductive member 40B and resistance RB2$d$ of the electricity supply line 310B (second electricity supply line) smaller than the sum (=RA1$d$+RB1$d$) of resistance RA1$d$ of the first electrically conductive member 40A and resistance RB1$d$ of the electricity supply line 310A (first electricity supply line) is not limited thereto. Specifically, in addition to the method mentioned above, there are a method of rendering resistance RA2da of the shaft 120B (second shaft) smaller than resistance RA1da of the shaft 120A (first shaft) (RA2da<RA1da) and a method of rendering resistance RB2d of the electricity supply line 310B (second electricity supply line) smaller than resistance RB1d of the electricity supply line 310A (first electricity supply line) (RB2d<RB1d).

Thus, by means of rendering resistance RB2d of the electricity supply line 310B (second electricity supply line) smaller than resistance RB1d of the electricity supply line 310A (first electricity supply line), or, in place of or in addition to this, rendering resistance RA2da of the shaft 120B (second shaft) smaller than resistance RA1da of the shaft 120A (first shaft), energization characteristics of the heaters 130A and 130B with respect to overall structures composed of the cables 300A and 300B and the glow plugs 20A and 20B can be brought close to each other.

In the case of employment of only the method of rendering resistance RB2d of the electricity supply line 310B (second electricity supply line) smaller than resistance RB1d of the electricity supply line 310A (first electricity supply line), the configuration of the present fourth embodiment becomes similar to that of the third embodiment shown in FIG. 12.

While the present invention has been described with reference to the first to fourth embodiments, the present invention is not limited thereto, but may be modified as appropriate without departing from the gist of the invention.

For example, in the first to fourth embodiments, the sensor incorporated plug 20A and the plugs 20B are so-called ceramic glow plugs having ceramic heaters as the heater 130A (first heater) and the heater 130B (second heater), respectively. However, the combustion pressure sensor incorporated glow plug and the sensor nonincorporated glow plug are not limited thereto. A so-called metal glow plug having a sheath heater may be employed.

In the first to fourth embodiments, as shown in FIGS. 7, 8, etc., the regression lines are drawn from voltage vs. temperature characteristics within a temperature range Tr of 950° C. to 1,350° C. However, in many cases, the metal glow plug is used with a highest temperature of the heater lower than that of the ceramic glow plug. Thus, the regression lines may be drawn from voltage vs. temperature characteristics in a temperature range of, for example, 950° C. to 1,100° C. instead of a temperature range of 950° C. to 1,350° C.

The first to fourth embodiments are described while mentioning the internal combustion engines 1, 1A, 1B, and 1C in which, of the four cylinders 11A to 11D of the engine body 10, the cylinder 11A is mounted with the sensor incorporated plug 20A, and the remaining three cylinders 11B to 11D are mounted with the respective plugs 20B having no pressure sensor. However, the present invention may be applied to an internal combustion engine in which the number of cylinders, the number of the combustion pressure sensor incorporated glow plugs, and the number of the sensor nonincorporated glow plugs differ from those of the embodiments; for example, of six cylinders of a 6-cylinder engine, two cylinders are mounted with respective combustion pressure sensor incorporated glow plugs, and the remaining four cylinders are mounted with the respective sensor nonincorporated glow plugs.

DESCRIPTION OF REFERENCE NUMERALS 1, 1A, 1B, 1C: internal combustion engine
10: engine body
11A, 11B, 11C, 11D: cylinder
20A: sensor incorporated plug (combustion pressure sensor incorporated glow plug)
20B: plug (sensor nonincorporated glow plug)
300A: electricity supply cable (first electricity supply cable)
300B: electricity supply cable (second electricity supply cable)
310A: electricity supply line (first electricity supply line)
310B: electricity supply line (second electricity supply line)
30A: first structure (first section)
30B: second structure (second section)
100A: housing (first housing)
100B: housing (second housing)
110A, 110B: metallic shell (housing)
120A: shaft (first shaft)
120B: shaft (second shaft)
130A: heater (first heater)
130B: heater (second heater)
150A: forward end cap (housing)
150B: outer tube (housing)
160A: external connection terminal (first external terminal)
160B: pin terminal (second external terminal)
170: membrane
190: inner tube
200: pressure sensor
210: sensor body (pressure sensor)
220: transmission sleeve (pressure sensor)
ECU: electronic control unit
GCU: glow plug control unit
DV1 to DV4: drive circuit
BT: external power supply (battery)
40A: first electrically conductive member
40B: second electrically conductive member
50A: first residual section
50B: second residual section
Lp1: first plug regression line
Lp2: second plug regression line
Lc1: first section regression line
Lc2: second section regression line
Lz1: first residual section regression line
Lz2: second residual section regression line
T1: first heater temperature
T2: second heater temperature
Tr: temperature range
Tx: predetermined temperature
Vp1: first plug voltage
Vp2: second plug voltage
Vc1: first section voltage
Vc2: second section voltage
Vz1: first residual section voltage
Vz2: second residual section voltage
Vp1x, Vz1x: first voltage
Vp2x, Vz2x: second voltage
Vc1x: third voltage
Vc2x: fourth voltage
RB1a, RB1b, RB1c, RB1d: resistance, first electricity supply line
RB2a, RB2b, RB2c, RB2d: resistance, second electricity supply line
RA1a, RA1b, RA1c, RA1d: resistance, first electrically conductive member
RA2a, RA2b, RA2c, RA2d: resistance, second electrically conductive member BA1aa, RA1ba, RA1ca, RA1da: resistance, first shaft
RA2aa, RA2ba, RA2ca, RA2da: resistance, second shaft

What is claimed is:

1. An internal combustion engine comprising:
an engine body having a plurality of cylinders;
a combustion pressure sensor incorporated glow plug mounted to at least one of the plurality of cylinders, comprising a first heater which generates heat through energization, and a pressure sensor for detecting combustion pressure of the respective cylinder;
a first electricity supply cable including a first electricity supply line for supplying electricity from an external power supply to the first heater;
a sensor nonincorporated glow plug mounted to each of the remaining cylinders to which the combustion pressure sensor incorporated glow plug is not mounted, comprising a second heater without a pressure sensor, which generates heat through energization; and
a second electricity supply cable including a second electricity supply line for supplying electricity from the external power supply to the second heater;
wherein resistance of the second electricity supply line is greater than resistance of the first electricity supply line;
wherein,
defining a first plug regression line as a first plug voltage vs. temperature characteristic indicative of a relation, within a temperature range of 950° C. to 1,350° C., between a first plug voltage applied to the combustion pressure sensor incorporated glow plug and a first heater temperature indicative of a temperature of heat generated by the first heater,
defining a second plug regression line as a second plug voltage vs. temperature characteristic indicative of a relation, within the temperature range, between a second plug voltage applied to the sensor nonincorporated glow plug and a second heater temperature indicative of a temperature of heat generated by the second heater,
defining a first voltage as the first plug voltage at which the first heater temperature becomes a predetermined temperature within the temperature range on the first plug regression line,
defining a second voltage as the second plug voltage at which the second heater temperature becomes the same predetermined temperature on the second plug regression line, and
defining a first-second plug voltage difference as a difference at the predetermined temperature between the first voltage and the second voltage,
the first plug regression line and the second plug regression line are in such a relation that, at any predetermined temperature within the temperature range, the second voltage is lower than the first voltage;
and wherein,
defining a first section regression line as a first section voltage vs. temperature characteristic indicative of a relation, within the temperature range, between a first section voltage applied to a first section comprising the combustion pressure sensor incorporated glow plug and the first electricity supply cable, and the first heater temperature,
defining a second section regression line as a second section voltage vs. temperature characteristic indicative of a relation, within the temperature range, between a second section voltage applied to a second section comprising the sensor nonincorporated glow plug and the second electricity supply cable, and the second heater temperature,
defining a third voltage as the first section voltage at which the first heater temperature becomes the predetermined temperature on the first section regression line,
defining a fourth voltage as the second section voltage at which the second heater temperature becomes the same predetermined temperature on the second section regression line, and
defining an overall voltage deviation as an absolute value of a difference at the predetermined temperature between the third voltage and the fourth voltage,
the first section regression line and the second section regression line are in such a relation that, at any predetermined temperature within the temperature range, the overall voltage deviation is smaller than the first-second plug voltage difference.

2. An internal combustion engine comprising:
an engine body having a plurality of cylinders;
a combustion pressure sensor incorporated glow plug mounted to at least one of the plurality of cylinders, comprising a first heater which generates heat through energization, and a pressure sensor for detecting combustion pressure of the respective cylinder;
a first electricity supply cable including a first electricity supply line for supplying electricity from an external power supply to the first heater;
a sensor nonincorporated glow plug mounted to each of the remaining cylinders to which the combustion pressure sensor incorporated glow plug is not mounted, comprising a second heater without a pressure sensor, which generates heat through energization; and
a second electricity supply cable including a second electricity supply line for supplying electricity from the external power supply to the second heater;
wherein,
the combustion pressure sensor incorporated glow plug has a first electrically conductive member connected to the first electricity supply line to electrically connect the first electricity supply line to the first heater,
the sensor nonincorporated glow plug has a second electrically conductive member connected to the second electricity supply line to electrically connect the second electricity supply line to the second heater, and
a sum of resistance of the second electrically conductive member and resistance of the second electricity supply line is greater than a sum of resistance of the first electrically conductive member and resistance of the first electricity supply line;
wherein,
defining a first residual section regression line as a first residual section voltage vs. temperature characteristic indicative of a relation, within a temperature range of 950° C. to 1,350° C., between a first residual section voltage applied to a first residual section encompassing the first heater without the first electrically conductive member, and a first heater temperature indicative of a temperature of heat generated by the first heater,
defining a second residual section regression line as a second residual section voltage vs. temperature characteristic indicative of a relation, within the temperature range, between a second residual section voltage applied to a second residual section encompassing the second heater without the second electrically conductive member, and a second heater temperature indicative of a temperature of heat generated by the second heater, defining a first voltage as the first residual section voltage at which the first heater temperature becomes a predetermined temperature within the temperature range on the first residual section regression line, defining a second voltage as the second residual section voltage at which the second heater temperature becomes the same predetermined temperature on the second residual section regression line, and defining a first-second residual section voltage difference as a difference at the predetermined temperature between the first voltage and the second voltage, the first residual section regression line and the second residual section regression line are in such a relation that, at any predetermined temperature within the temperature range, the second voltage is lower than the first voltage;

and wherein, defining a first section regression line as a first section voltage vs. temperature characteristic indicative of a relation, within the temperature range, between a first section voltage applied to a first section comprising the combustion pressure sensor incorporated glow plug and the first electricity supply cable, and the first heater temperature, defining a second section regression line as a second section voltage vs. temperature characteristic indicative of a relation, within the temperature range, between a second section voltage applied to a second section comprising the sensor nonincorporated glow plug and the second electricity supply cable, and the second heater temperature, defining a third voltage as the first section voltage at which the first heater temperature becomes the predetermined temperature on the first section regression line, defining a fourth voltage as the second section voltage at which the second heater temperature becomes the same predetermined temperature on the second section regression line, and defining an overall voltage deviation as an absolute value of a difference at the predetermined temperature between the third voltage and the fourth voltage, the first section regression line and the second section regression line are in such a relation that, at any predetermined temperature within the temperature range, the overall voltage deviation is smaller than the first-second residual section voltage difference.

3. An internal combustion engine according to claim 2, wherein:

the combustion pressure sensor incorporated glow plug further comprises a tubular first housing which accommodates the first heater in such a manner that a forward end portion of the first heater protrudes from a forward end of the first housing;

the first electrically conductive member includes a first external terminal disposed at a rear side and connected to the first electricity supply line, and a rodlike first shaft inserted in the first housing and electrically connecting the first heater and the first external terminal;

the sensor nonincorporated glow plug further comprises a tubular second housing which accommodates the second heater in such a manner that a forward end portion of the second heater protrudes from a forward end of the second housing;

the second electrically conductive member includes a second external terminal disposed at a rear side and connected to the second electricity supply line, and a rodlike second shaft inserted in the second housing and electrically connecting the second heater and the second external terminal; and resistance of the second shaft is greater than resistance of the first shaft.

4. An internal combustion engine according to claim 2, wherein:

the combustion pressure sensor incorporated glow plug further comprises a tubular first housing which accommodates the first heater in such a manner that a forward end portion of the first heater protrudes from a forward end of the first housing;

the first electrically conductive member includes a first external terminal disposed at a rear side and connected to the first electricity supply line, and a rodlike first shaft inserted in the first housing and electrically connecting the first heater and the first external terminal;

the sensor nonincorporated glow plug further comprises a tubular second housing which accommodates the second heater in such a manner that a forward end portion of the second heater protrudes from a forward end of the second housing;

the second electrically conductive member includes a second external terminal disposed at a rear side and connected to the second electricity supply line, and a rodlike second shaft inserted in the second housing and electrically connecting the second heater and the second external terminal; and resistance of the second electricity supply line is greater than resistance of the first electricity supply line.

5. An internal combustion engine comprising:

an engine body having a plurality of cylinders;

a combustion pressure sensor incorporated glow plug mounted to at least one of the plurality of cylinders, comprising a first heater which generates heat through energization, and a pressure sensor for detecting combustion pressure of the respective cylinder;

a first electricity supply cable including a first electricity supply line for supplying electricity from an external power supply to the first heater;

a sensor nonincorporated glow plug mounted to each of the remaining cylinders to which the combustion pressure sensor incorporated glow plug is not mounted, comprising a second heater without a pressure sensor, which generates heat through energization; and a second electricity supply cable including a second electricity supply line for supplying electricity from the external power supply to the second heater;

wherein resistance of the second electricity supply line is smaller than resistance of the first electricity supply line;

wherein, defining a first plug regression line as a first plug voltage vs. temperature characteristic indicative of a relation, within a temperature range of 950° C. to 1,350° C., between a first plug voltage applied to the combustion pressure sensor incorporated glow plug and a first heater temperature indicative of a temperature of heat generated by the first heater, defining a second plug regression line as a second plug voltage vs. temperature characteristic indicative of a relation, within the temperature range, between a second plug voltage applied to the sensor nonincorporated glow plug and a second heater temperature indicative of a temperature of heat generated by the second heater, defining a first voltage as the first plug voltage at which the first heater temperature becomes a predetermined temperature within the temperature range on the first plug regression line, defining a second voltage as the second plug voltage at which the second heater temperature becomes the same predetermined temperature on the second plug regression line, and defining a second-first plug voltage difference as a difference at the predetermined temperature between the second voltage and the first voltage, the first plug regression line and the second plug regression line are in such a relation that, at any predetermined temperature within the temperature range, the second voltage is higher than the first voltage;

and wherein, defining a first section regression line as a first section voltage vs. temperature characteristic indicative of a relation, within the temperature range, between a first section voltage applied to a first section comprising the combustion pressure sensor incorporated glow plug and the first electricity supply cable, and the first heater temperature, defining a second section regression line as a second section voltage vs. temperature characteristic indicative of a relation, within the temperature range, between a second section voltage applied to a second section comprising the sensor nonincorporated glow plug and the second electricity supply cable, and the second heater temperature, defining a third voltage as the first section voltage at which the first heater temperature becomes the predetermined temperature on the first section regression line, defining a fourth voltage as the second section voltage at which the second heater temperature becomes the same predetermined temperature on the second section regression line, and defining an overall voltage deviation as an absolute value of a difference at the predetermined temperature between the fourth voltage and the third voltage, the first section regression line and the second section regression line are in such a relation that, at any predetermined temperature within the temperature range, the overall voltage deviation is smaller than the second-first plug voltage difference.

6. An internal combustion engine comprising:

an engine body having a plurality of cylinders;

a combustion pressure sensor incorporated glow plug mounted to at least one of the plurality of cylinders, comprising a first heater which generates heat through energization, and a pressure sensor for detecting combustion pressure of the respective cylinder;

a first electricity supply cable including a first electricity supply line for supplying electricity from an external power supply to the first heater;

a sensor nonincorporated glow plug mounted to each of the remaining cylinders to which the combustion pressure sensor incorporated glow plug is not mounted, comprising a second heater without a pressure sensor, which generates heat through energization; and a second electricity supply cable including a second electricity supply line for supplying electricity from the external power supply to the second heater;

wherein, the combustion pressure sensor incorporated glow plug has a first electrically conductive member connected to the first electricity supply line to electrically connect the first electricity supply line to the first heater, the sensor nonincorporated glow plug has a second electrically conductive member connected to the second electricity supply line to electrically connect the second electricity supply line to the second heater, and a sum of resistance of the second electrically conductive member and resistance of the second electricity supply line is smaller than a sum of resistance of the first electrically conductive member and resistance of the first electricity supply line;

wherein, defining a first residual section regression line as a first residual section voltage vs. temperature characteristic indicative of a relation, within a temperature range of 950° C. to 1,350° C., between a first residual section voltage applied to a first residual section encompassing the first heater without the first electrically conductive member, and a first heater temperature indicative of a temperature of heat generated by the first heater, defining a second residual section regression line as a second residual section voltage vs. temperature characteristic indicative of a relation, within the temperature range, between a second residual section voltage applied to a second residual section encompassing the second heater without the second electrically conductive member, and a second heater temperature indicative of a temperature of heat generated by the second heater, defining a first voltage as the first residual section voltage at which the first heater temperature becomes a predetermined temperature within the temperature range on the first residual section regression line, defining a second voltage as the second residual section voltage at which the second heater temperature becomes the same predetermined temperature on the second residual section regression line, and defining a second-first residual section voltage difference as a difference at the predetermined temperature between the second voltage and the first voltage, the first residual section regression line and the second residual section regression line are in such a relation that, at any predetermined temperature within the temperature range, the second voltage is higher than the first voltage;

and wherein, defining a first section regression line as a first section voltage vs. temperature characteristic indicative of a relation, within the temperature range, between a first section voltage applied to a first section comprising the combustion pressure sensor incorporated glow plug and the first electricity supply cable, and the first heater temperature, defining a second section regression line as a second section voltage vs. temperature characteristic indicative of a relation, within the temperature range, between a second section voltage applied to a second section comprising the sensor nonincorporated glow plug and the second electricity supply cable, and the second heater temperature, defining a third voltage as the first section voltage at which the first heater temperature becomes the predetermined temperature on the first section regression line, defining a fourth voltage as the second section voltage at which the second heater temperature becomes the same predetermined temperature on the second section regression line, and defining an overall voltage deviation is an absolute value of a difference at the predetermined temperature between the fourth voltage and the third voltage, the first section regression line and the second section regression line are in such a relation that, at any predetermined temperature within the temperature range, the overall voltage deviation is smaller than the second-first residual section voltage difference.

7. An internal combustion engine according to claim 6, wherein the combustion pressure sensor incorporated glow plug further comprises a tubular first housing which accommodates the first heater in such a manner that a forward end portion of the first heater protrudes from a forward end of the first housing;

the first electrically conductive member includes a first external terminal disposed at a rear side and connected to the first electricity supply line, and a rodlike first shaft inserted in the first housing and electrically connecting the first heater and the first external terminal;

the sensor nonincorporated glow plug further comprises a tubular second housing which accommodates the second heater in such a manner that a forward end portion of the second heater protrudes from a forward end of the second housing;

the second electrically conductive member includes a second external terminal disposed at a rear side and connected to the second electricity supply line, and a rodlike second shaft inserted in the second housing and electrically connecting the second heater and the second external terminal; and resistance of the second shaft is smaller than resistance of the first shaft.

8. An internal combustion engine according to claim 6, wherein the combustion pressure sensor incorporated glow plug further comprises a tubular first housing which accommodates the first heater in such a manner that a forward end portion of the first heater protrudes from a forward end of the first housing;

the first electrically conductive member includes a first external terminal disposed at a rear side and connected to the first electricity supply line, and a rodlike first shaft inserted in the first housing and electrically connecting the first heater and the first external terminal;

the sensor nonincorporated glow plug further comprises a tubular second housing which accommodates the second heater in such a manner that a forward end portion of the second heater protrudes from a forward end of the second housing;

the second electrically conductive member includes a second external terminal disposed at a rear side and connected to the second electricity supply line, and a rodlike second shaft inserted in the second housing and electrically connecting the second heater and the second external terminal; and resistance of the second electricity supply line is smaller than resistance of the first electricity supply line.

* * * * *